(12) United States Patent
Wright

(10) Patent No.: US 9,764,847 B2
(45) Date of Patent: Sep. 19, 2017

(54) ANTI-ICING SYSTEM FOR AIRCRAFT

(71) Applicant: The Boeing Company, Chicago, IL (US)

(72) Inventor: Robert Steven Wright, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 946 days.

(21) Appl. No.: 14/156,599

(22) Filed: Jan. 16, 2014

(65) Prior Publication Data

US 2015/0108233 A1   Apr. 23, 2015

Related U.S. Application Data

(60) Provisional application No. 61/892,616, filed on Oct. 18, 2013.

(51) Int. Cl.
| | |
|---|---|
| *B64D 15/04* | (2006.01) |
| *B64D 13/08* | (2006.01) |
| *B64D 33/02* | (2006.01) |
| B64C 3/32 | (2006.01) |

(52) U.S. Cl.
CPC ............ *B64D 13/08* (2013.01); *B64D 15/04* (2013.01); *B64D 33/02* (2013.01); *B64D 2033/0233* (2013.01)

(58) Field of Classification Search
CPC  B64D 13/08; B64D 15/04; B64D 2033/0233; B64D 15/12; B64D 15/10; B64D 15/02; B64D 37/00; B64D 33/02; B64F 5/0054; B64C 3/34

USPC ........ 237/12.3 R, 12.3 A; 244/134 C, 134 B, 244/134 D, 134 R
IPC ........................ B64D 15/04,13/08; B64C 3/32
See application file for complete search history.

(56) References Cited

U.S. PATENT DOCUMENTS

| 1,716,276 | A | * | 6/1929 | Koch | ..................... B64D 15/04 |
|---|---|---|---|---|---|
| | | | | | 237/12.3 A |
| 2,330,298 | A | * | 9/1943 | McCollum | ............. B64D 13/08 |
| | | | | | 237/12.3 C |
| 2,346,966 | A | * | 4/1944 | Heymann | ............ B60H 1/2203 |
| | | | | | 123/550 |
| 2,347,142 | A | * | 4/1944 | Whitted | ................. B64D 13/08 |
| | | | | | 137/563 |
| 2,364,458 | A | * | 12/1944 | McCollum | ............. B64D 13/08 |
| | | | | | 126/110 B |

(Continued)

FOREIGN PATENT DOCUMENTS

| EP | 0436243 A2 | 7/1991 | |
|---|---|---|---|
| EP | 1495963 A2 * | 1/2005 | ............. B64D 15/12 |

(Continued)

OTHER PUBLICATIONS

International Search Report and Written Opinion, dated Dec. 5, 2014, regarding Application No. PCT/US2014/055932, 12 pages.

*Primary Examiner* — Gregory Huson
*Assistant Examiner* — Daniel E Namay
(74) *Attorney, Agent, or Firm* — Yee & Associates, P.C.

(57) ABSTRACT

A method and apparatus for heating a surface of an aircraft. A flow of air is received from a portion of an engine in a tube system. The air flowing through the tube system is heated. The air is sent to the surface of the aircraft. The flow of the air from the portion of the engine and the heating system to heat the surface of the aircraft are controlled. Icing conditions at the surface of the aircraft are reduced.

19 Claims, 17 Drawing Sheets

(56) References Cited

U.S. PATENT DOCUMENTS

| | | | | |
|---|---|---|---|---|
| 2,374,606 A * | 4/1945 | McCollum | ............ | B64D 13/08 126/116 A |
| 2,377,027 A * | 5/1945 | Morgan | ............ | B64D 13/08 219/202 |
| 2,382,493 A * | 8/1945 | McCollum | ............ | B64D 13/08 237/12.3 C |
| 2,443,262 A * | 6/1948 | McCollum | ............ | B64D 13/08 126/110 R |
| 2,448,826 A * | 9/1948 | Reaser | ............ | B64D 13/08 237/1 SL |
| 5,196,673 A * | 3/1993 | Tanis | ............ | B23P 19/068 123/142.5 E |
| 6,155,213 A * | 12/2000 | Tanis | ............ | F01M 5/001 123/41.86 |
| 6,443,395 B1 * | 9/2002 | Porte | ............ | B64D 15/04 244/134 R |
| 7,124,983 B2 | 10/2006 | Chow et al. | | |
| 2002/0027180 A1 * | 3/2002 | Porte | ............ | B64D 15/04 244/134 R |
| 2002/0139900 A1 * | 10/2002 | Porte | ............ | B64D 15/04 244/134 C |
| 2002/0148929 A1 * | 10/2002 | Andre | ............ | B64D 15/04 244/134 R |
| 2004/0159103 A1 * | 8/2004 | Kurtz | ............ | F01D 17/08 60/772 |
| 2006/0288703 A1 * | 12/2006 | Kurtz | ............ | F01D 17/08 60/772 |
| 2007/0084969 A1 * | 4/2007 | Ellstrom | ............ | B64D 15/04 244/135 R |
| 2007/0267536 A1 * | 11/2007 | Hill | ............ | F02C 7/047 244/1 R |
| 2010/0108814 A1 * | 5/2010 | Etling | ............ | B64D 15/04 244/134 B |
| 2010/0209084 A1 * | 8/2010 | Nelson | ............ | F24H 4/04 392/465 |
| 2011/0226903 A1 * | 9/2011 | Porte | ............ | B64D 15/02 244/134 B |
| 2011/0266393 A1 * | 11/2011 | Liczbinski | ............ | B64F 5/0072 244/134 C |
| 2012/0298802 A1 * | 11/2012 | Todorovic | ............ | B64D 15/04 244/134 B |
| 2012/0318922 A1 * | 12/2012 | Saito | ............ | B64D 15/04 244/134 B |
| 2013/0195658 A1 * | 8/2013 | Saito | ............ | F01D 25/02 416/39 |
| 2013/0197827 A1 * | 8/2013 | Besore | ............ | G06Q 50/06 702/45 |

FOREIGN PATENT DOCUMENTS

| | | | | |
|---|---|---|---|---|
| EP | 2204320 A2 * | 7/2010 | ............ | B64D 15/04 |
| EP | 2327627 A2 | 6/2011 | | |
| EP | 2546147 A1 | 1/2013 | | |
| FR | 2637251 A1 * | 4/1990 | ............ | B64D 15/04 |
| FR | WO 2007110499 A1 * | 10/2007 | ............ | B64D 15/04 |
| FR | 2940377 A1 * | 6/2010 | ............ | B64D 33/02 |
| FR | WO 2010086560 A2 * | 8/2010 | ............ | B64D 15/04 |
| GB | 486549 A * | 6/1938 | ............ | B64D 15/04 |
| JP | 02130225 A * | 5/1990 | ............ | B64D 15/04 |
| JP | 04110299 A * | 4/1992 | ............ | B64C 21/06 |
| JP | 06221184 A * | 8/1994 | ............ | B64D 15/04 |
| JP | 2007255421 A * | 10/2007 | ............ | B64D 15/04 |
| JP | 2011183922 A * | 9/2011 | ............ | B64C 3/28 |
| JP | 2012046151 A * | 3/2012 | ............ | B64D 15/04 |
| JP | 2012229690 A * | 11/2012 | ............ | B64D 15/04 |
| JP | 2013163478 A * | 8/2013 | | |
| JP | 2013163479 A * | 8/2013 | | |
| WO | WO2009055125 A2 | 4/2009 | | |

* cited by examiner

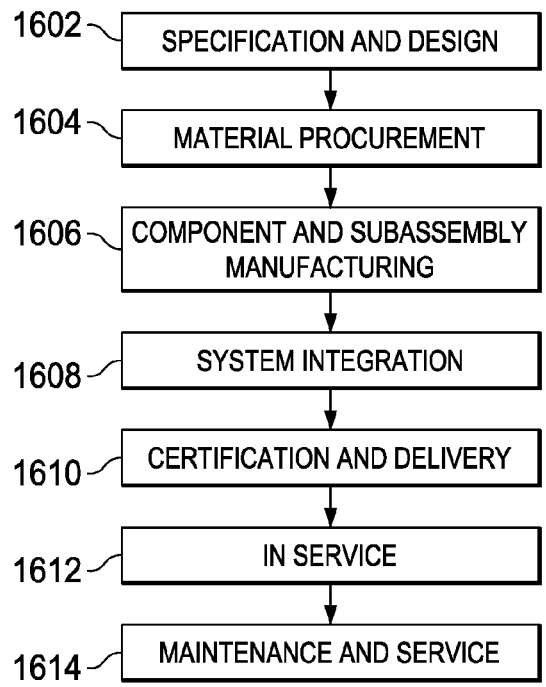
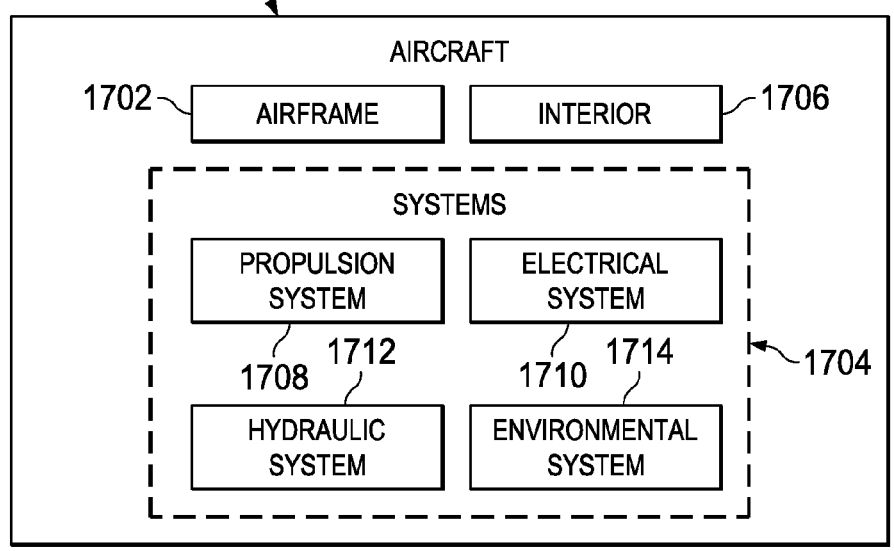

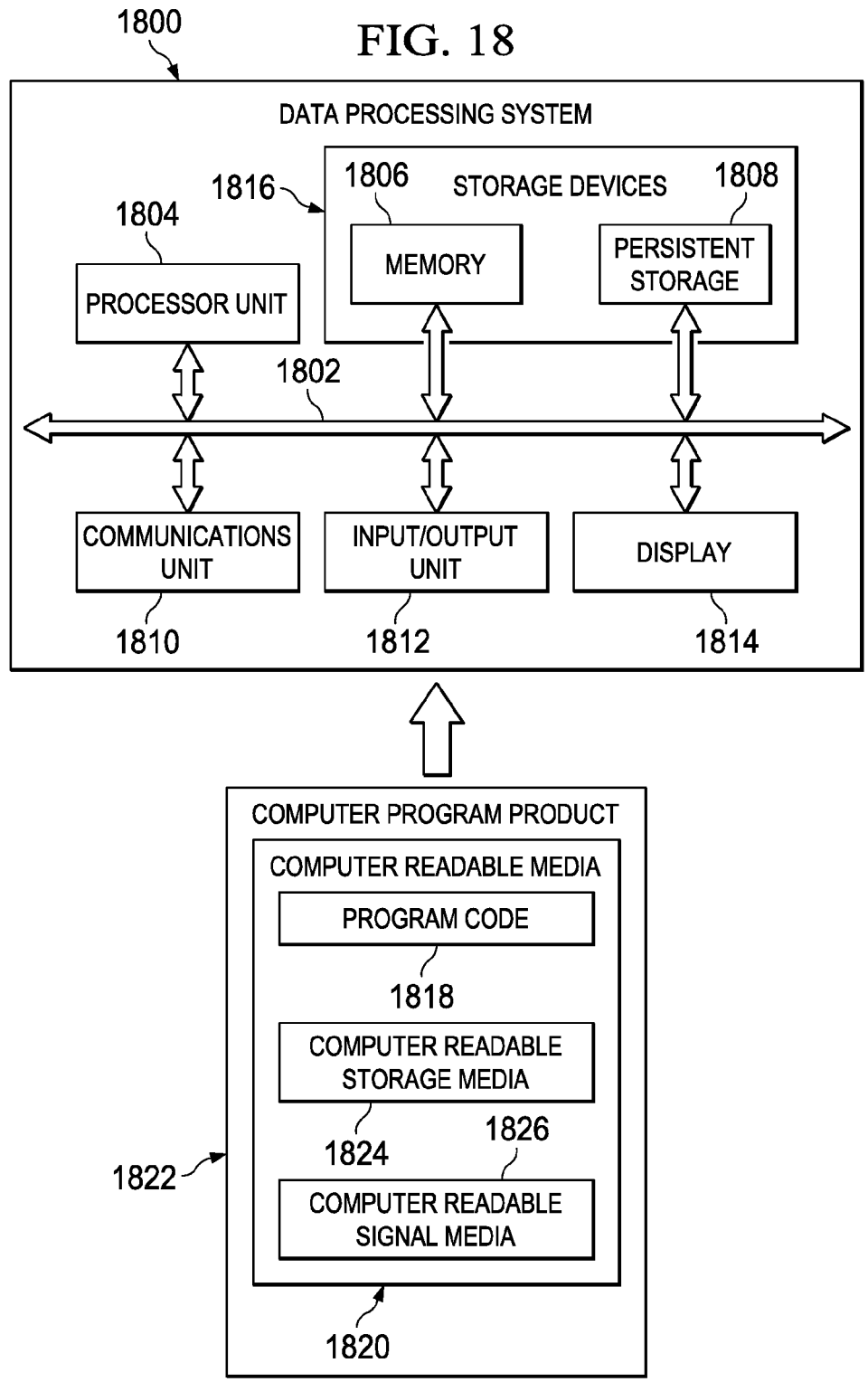

ANTI-ICING SYSTEM FOR AIRCRAFT

RELATED PROVISIONAL APPLICATION

This application claims the benefit of U.S. Provisional Patent Application Ser. No. 61/892,616, filed Oct. 18, 2013, and entitled "Anti-Icing System for Aircraft."

BACKGROUND INFORMATION

1. Field

The present disclosure relates generally to aircraft and icing conditions and, in particular, to reducing icing conditions for aircraft. Still more particularly, the present disclosure relates to a method and apparatus for an anti-icing system for aircraft.

2. Background

In aviation, icing on an aircraft may occur when atmospheric conditions lead to the formation of ice on the surfaces of the aircraft. In some cases, the formation of ice also may occur within the engine. Ice forming on the surfaces of the aircraft, on inlets of an engine, and on other locations is undesirable and potentially unsafe for operating the aircraft. When these conditions occur, the formation of ice may reduce the performance of the aircraft in an undesired manner.

Icing conditions may occur when drops of supercooled liquid water are present. In these illustrative examples, water is considered to be supercooled when the water is cooled below the stated freezing point for water but is still in a liquid form. Icing conditions may be characterized by the size of the drops, the liquid water content, air temperature, and other parameters. These parameters may affect the rate and extent at which ice forms on an aircraft.

When icing occurs, the aircraft may not operate as desired. For example, ice on the wing of an aircraft may cause the aircraft to perform undesirably at a higher angle of attack and have an increased drag or reduced maximum achievable coefficient of lift. This situation may reduce fuel efficiency for the aircraft or reduce the level flight stalling speed.

Aircraft may have mechanisms to prevent icing, remove ice, or some combination thereof to handle these icing conditions. For example, aircraft may include ice protection systems that detect icing on the aircraft, prevent ice from forming on the surface of the aircraft, remove ice from the surface of the aircraft, or some combination thereof. These icing protection systems may be referred to as anti-icing systems. Ice may be prevented from forming on the surface of the aircraft using bleed air, infrared heating, and other suitable mechanisms.

In some cases, however, anti-icing systems for aircraft may be more costly than desired due to size, weight, complexity, and other factors that may be present with particular types of aircraft. Moreover, some anti-icing systems for aircraft may use more power than desired or may increase the temperature of the surface of the aircraft more than desired in various environmental conditions. Therefore, it would be desirable to have a method and apparatus that take into account at least some of the issues discussed above, as well as other possible issues.

SUMMARY

In one illustrative embodiment, an apparatus comprises a tube system and a heating system physically associated with the tube system. The tube system is configured to receive air from a portion of an engine. The tube system is further configured to direct the air to a surface of an aircraft. The heating system is configured to heat the air flowing through the tube system.

In another illustrative embodiment, a method for heating a surface of an aircraft is provided. A flow of air is received from a portion of an engine in a tube system. The air flowing through the tube system is heated. The air is sent to the surface of the aircraft. The flow of the air from the portion of the engine and the heating system to heat the surface of the aircraft are controlled. Icing conditions at the surface of the aircraft are reduced.

In yet another illustrative embodiment, an aircraft anti-icing system comprises a tube system, a heating system physically associated with the tube system, a nozzle, a valve physically associated with a tube, a sensor system, and a controller. The tube system is configured to receive air from a portion of an engine. The tube system is further configured to send the air to a surface of an aircraft. The heating system is configured to heat the air flowing through the tube system. The nozzle is configured to direct a flow of the air into an inlet for the engine. The valve is configured to be moved to control the flow of the air through the tube system. The sensor system is configured to generate information about at least one of an inner pressure or a temperature. The controller is configured to control the flow of the air from the portion of the engine. The controller is further configured to control the heating system to heat the surface of the aircraft. Icing conditions at the surface of the aircraft are reduced.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 16 is an illustration of a block diagram of an aircraft manufacturing and service method in accordance with an illustrative embodiment;

FIG. 17 is an illustration of a block diagram of an aircraft in which an illustrative embodiment may be implemented; and FIG. 18 is an illustration of a block diagram of a data processing system in accordance with an illustrative embodiment.

DETAILED DESCRIPTION

The illustrative embodiments recognize and take into account one or more different considerations. For example, the illustrative embodiments recognize and take into account that it may be desirable to provide an anti-icing system that uses bleed air received from a portion of an engine before work has been performed on the air. In this illustrative example, "bleed air" refers to air taken from within a portion of an engine. This bleed air may be compressed. In these illustrative examples, air is considered to be compressed when the air has a greater pressure than air entering the aircraft. Often, this compressed air is taken from the compressor in the engine at one or more stages of the compressor.

The illustrative embodiments recognize and take into account that the earlier in the process this bleed air may be taken from the engine, the less work may need to be performed on the bleed air. Accordingly, the illustrative embodiments recognize and take into account that it may be desirable to take bleed air from a lower stage of a compressor in an engine. When air is taken from the compressor at a lower stage, less power may be needed to provide air for the anti-icing system.

The illustrative embodiments also recognize and take into account that it may be desirable to provide an anti-icing system that is less prone to undesired encounters with debris while the aircraft is operating. For example, in some cases, components in an anti-icing system may be arranged such that some components are exposed to the environment around the aircraft. During flight, these components may face undesired encounters with weather, debris, and other materials that may harm the components. As a result, maintenance, recalibration, and rework may increase the cost of the anti-icing system more than desired.

The illustrative embodiments further recognize and take into account that it may be desirable to reduce the cost and complexity of an anti-icing system used for aircraft. In some cases, anti-icing systems may include more components, require more maintenance, and consume more power than desired.

Thus, the illustrative embodiments provide a method and apparatus to reduce icing conditions at a surface of an aircraft. An apparatus comprises a tube system, a heating system, and a controller. The tube system is configured to receive air from a portion of an engine and send the air to a surface of an aircraft. The heating system is physically associated with the tube system. The heating system is configured to heat the air flowing through the tube system. The controller is configured to control a flow of the air from the portion of the engine. The controller is further configured to control the heating system to heat the surface of the aircraft such that icing conditions at the surface of the aircraft are reduced.

Figure 1:
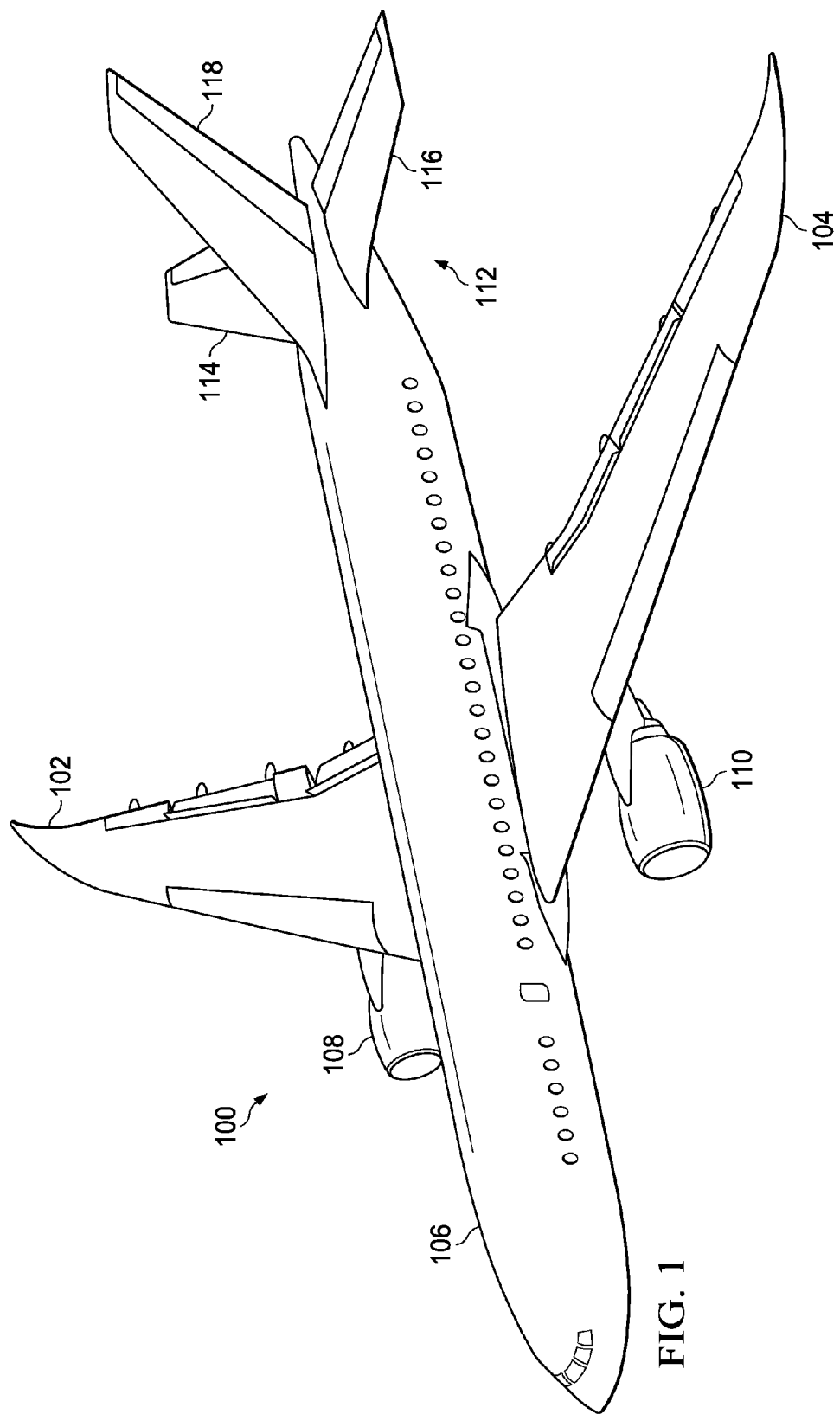
FIG. 1 is an illustration of an aircraft in accordance with an illustrative embodiment.

Referring now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which an anti-icing system may be implemented in accordance with an illustrative embodiment. In this illustrative example, an anti-icing system may be a system configured to reduce icing conditions on a surface of an aircraft. As an example, an anti-icing system may substantially prevent ice from forming on the surface of the aircraft, remove ice from the surface of the aircraft, or some combination thereof.

In some examples, the anti-icing system may be used to heat air to reduce icing conditions on one or more surfaces of aircraft 100. For example, the anti-icing system may be used to heat air to reduce icing conditions for surfaces selected from at least one of wing 102, wing 104, engine 108, engine 110, tail section 112, or other surfaces on aircraft 100.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The illustration of aircraft 100 in FIG. 1 is not meant to imply physical or architectural limitations to the manner in which an illustrative configuration may be implemented. For example, although aircraft 100 is shown as a commercial aircraft, aircraft 100 also may be a military aircraft, a rotorcraft, a helicopter, an unmanned aerial vehicle, or any other suitable aircraft.

Figure 2:
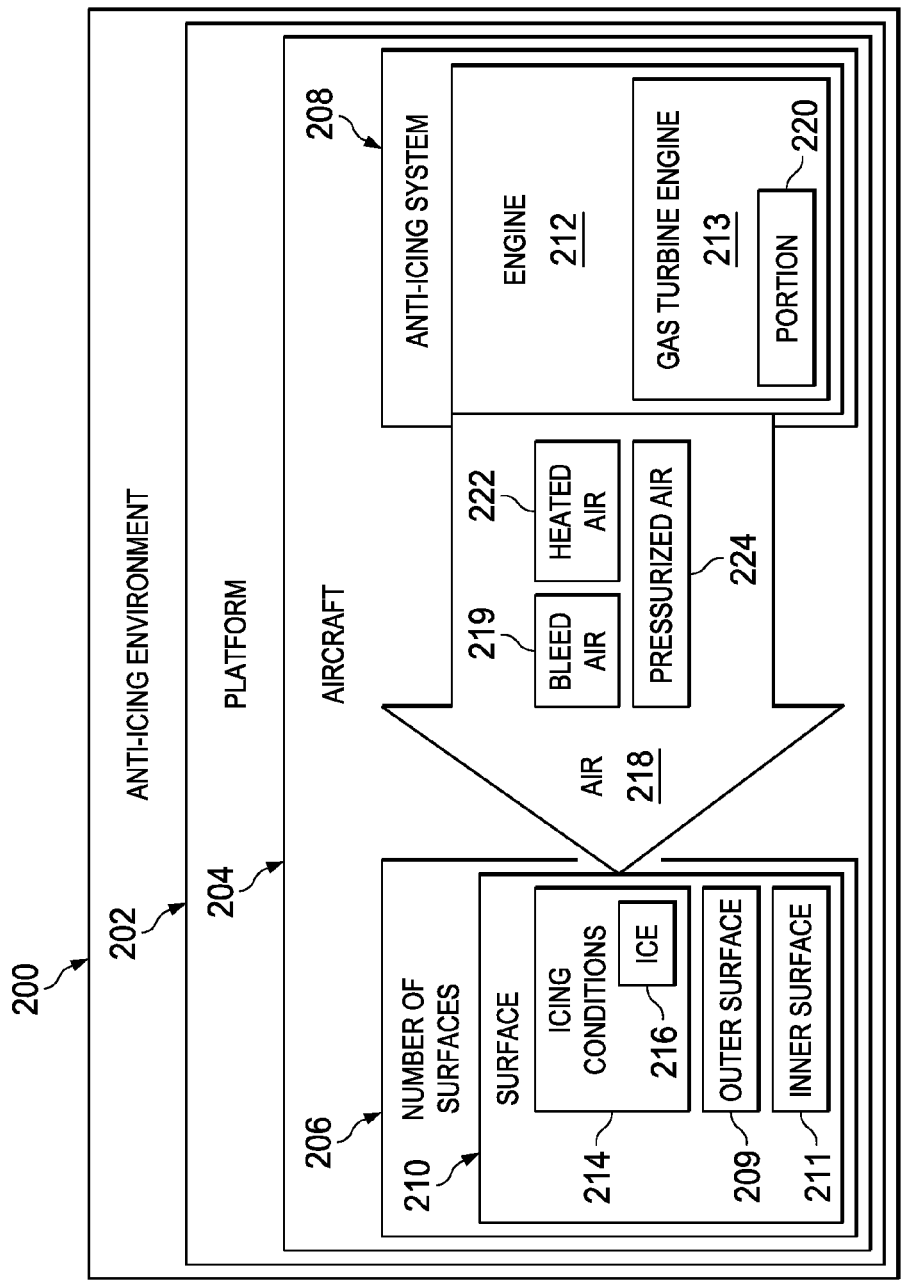
FIG. 2 is an illustration of a block diagram of an anti-icing environment in accordance with an illustrative embodiment.

With reference next to FIG. 2, an illustration of a block diagram of an anti-icing environment is depicted in accordance with an illustrative embodiment. In this depicted example, anti-icing environment 200 is illustrated with platform 202.

In this illustrative example, platform 202 may take the form of aircraft 204. Aircraft 100 in FIG. 1 is one example of one implementation of aircraft 204 shown in this figure.

As illustrated, aircraft 204 includes number of surfaces 206 and anti-icing system 208. As used herein, a "number of" items may be one or more items. For example, number of surfaces 206 may be one or more surfaces.

In this illustrative example, number of surfaces 206 includes surface 210. Surface 210 may be selected from at least one of engine 212, a skin panel, a wing, a fuselage, or some other suitable surface on aircraft 204. Surface 210 also may be selected from at least one of outer surface 209 or inner surface 211 of aircraft 204.

In this depicted example, outer surface 209 is a surface of aircraft 204 exposed to an environment around the exterior of aircraft 204. For example, without limitation, outer surface 209 may be a skin panel on a wing of aircraft 204. Inner surface 211 is a surface in an interior of aircraft 204 and may not be exposed to the environment on the exterior of aircraft 204. For example, without limitation, inner surface 211 may be an inner wall of the cabin of the fuselage.

In this illustrative example, engine 212 may be gas turbine engine 213. Gas turbine engine 213 is an internal combustion engine for aircraft 204. In other illustrative examples, engine 212 may be a different type of engine other than gas turbine engine 213. When engine 212 is gas turbine engine 213, engine 212 includes an inlet portion, a compressor, a combustion portion, a turbine, and other suitable components.

As depicted, number of surfaces 206 may experience icing conditions 214. In particular, surface 210 in number of surfaces 206 may experience the formation of ice 216 when icing conditions 214 are present in the environment around aircraft 204.

Icing conditions 214 may occur when aircraft 204 is in various stages of operation including, for example, without limitation, taxiing, takeoff, ascent, cruising, descent, landing, and other suitable stages of operation. In other illustrative examples, icing conditions 214 may be simulated during testing of aircraft 204. These different stages of operation may also be referred to as phases of flight for aircraft 204.

As illustrated, anti-icing system 208 may be configured to substantially prevent the formation of ice 216 on surface 210 of aircraft 204, remove ice 216 from surface 210 of aircraft 204, or a combination thereof. For example, anti-icing system 208 may prevent ice 216 from forming on surface 210 within desired tolerances. In other words, anti-icing system 208 may be configured to prevent any ice 216 from forming on surface 210, prevent ice 216 from forming on surface 210 at a particular thickness, or both. In other illustrative examples, anti-icing system 208 may melt ice 216 formed on surface 210 when icing conditions 214 are present.

In this illustrative example, anti-icing system 208 may prevent ice 216 from forming on surface 210 of aircraft 204 using air 218 from engine 212 of aircraft 204. In particular, anti-icing system 208 may prevent ice 216 from forming on surface 210 of aircraft 204 using air 218 from portion 220 of engine 212. In one example, portion 220 may be a compressor of gas turbine engine 213. In other examples, portion 220 may be a different portion of engine 212, depending on the particular implementation. For instance, portion 220 may be the combustion portion or some other suitable portion of engine 212.

Air 218 may be bleed air 219 in this illustrative example. Air 218 may include at least one of heated air 222 or pressurized air 224. Heated air 222 may be air 218 heated to a desired temperature in these illustrative examples. The desired temperature for heated air 222 may be selected to prevent ice 216 from forming on surface 210 of aircraft 204.

In this depicted example, pressurized air 224 may be compressed air taken from engine 212. Pressurized air 224 may be compressed in the compressor of engine 212 to a desired pressure that may be greater than atmospheric pressure. For example, without limitation, pressurized air 224 may be compressed to 40 pounds per square inch (PSI). In other examples, pressurized air 224 may be compressed to other suitable pressures, depending on the particular implementation. In this illustrative example, pressurized air 224 may be compressed to a pressure such that air 218 reaches surface 210 of aircraft 204 in a desired manner.

Figure 3:
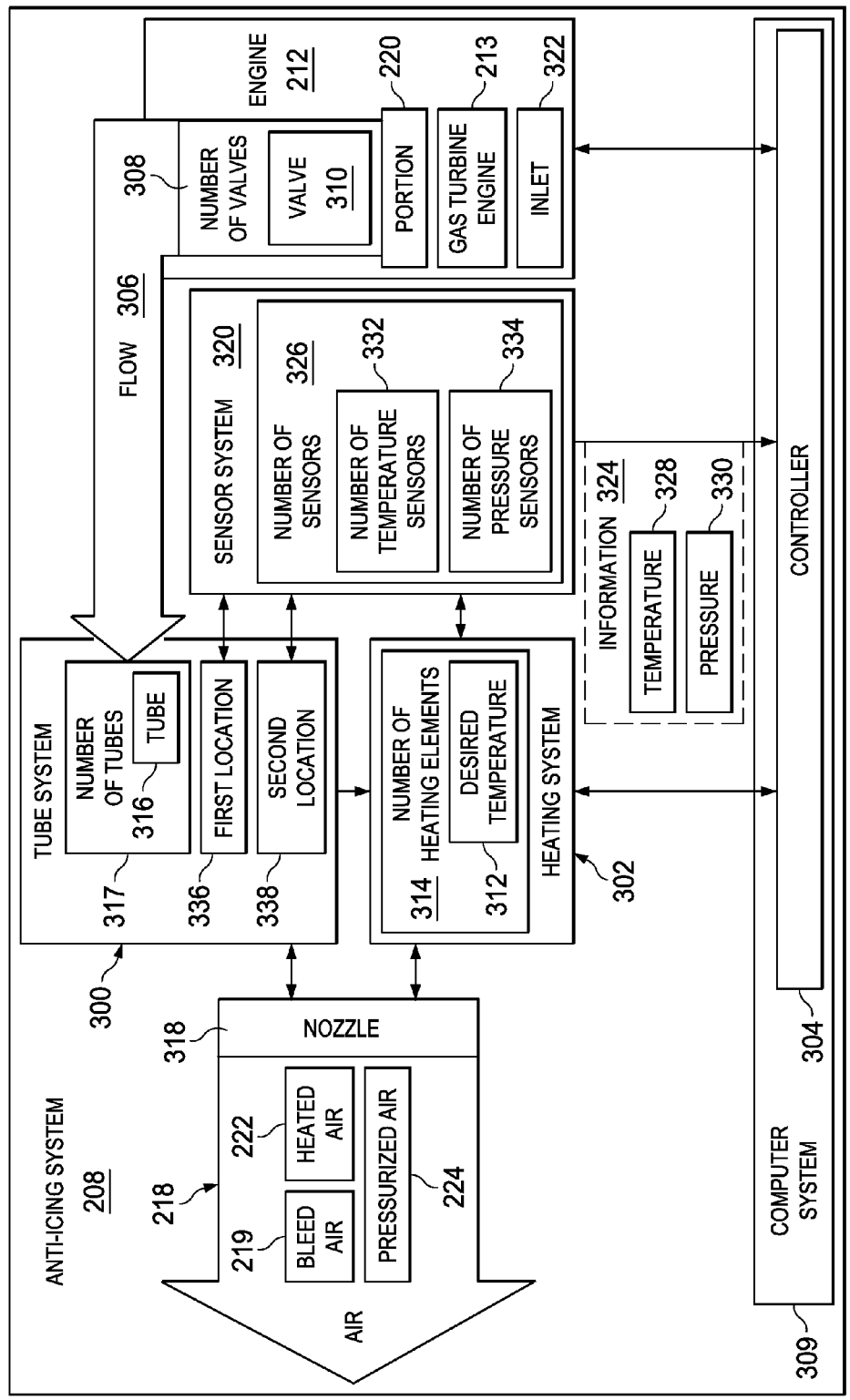
FIG. 3 is an illustration of a block diagram of an anti-icing system in accordance with an illustrative embodiment.

Turning next to FIG. 3, an illustration of a block diagram of an anti-icing system is depicted in accordance with an illustrative embodiment. In this depicted example, a more detailed illustration of anti-icing system 208 in aircraft 204 from FIG. 2 is shown.

As depicted, anti-icing system 208 comprises tube system 300, heating system 302, and controller 304. In this illustrative example, tube system 300 is configured to receive air 218 from portion 220 of engine 212 and send air 218 to surface 210 of aircraft 204 in FIG. 2. In other words, flow 306 of air 218 may travel through tube system 300 to surface 210 of aircraft 204.

In this depicted example, heating system 302 is associated with tube system 300. As used herein, when one component is "associated" with another component, the association is a physical association in the depicted examples. For example, a first component, such as heating system 302, may be considered to be associated with a second component, such as tube system 300, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

As illustrated, heating system 302 is configured to heat air 218 flowing through tube system 300. In this example, heating system 302 may be arranged along tube system 300 at a desired location. This location may be selected along tube system 300 such that power consumption and heat loss are reduced. For example, heating system 302 may be arranged at an end of tube system 300 opposite portion 220 of engine 212 such that air 218 is heated by heating system 302 right before air 218 is directed onto surface 210 of aircraft 204. In this manner, less work may be performed on air 218 to get air 218 to a desired temperature. As a result, at least one of power consumption of anti-icing system 208 or heat lost during travel through tube system 300 in anti-icing system 208 may be reduced.

In this illustrative example, controller 304 may be configured to control flow 306 of air 218 from portion 220 of engine 212. For example, controller 304 may be configured to control flow 306 of air 218 from portion 220 of engine 212 using number of valves 308.

In this illustrative example, controller 304 may be implemented in software, hardware, firmware, or a combination thereof. When software is used, the operations performed by controller 304 may be implemented using, for example, without limitation, program code configured to run on a processor unit. When firmware is used, the operations performed by controller 304 may be implemented using, for example, without limitation, program code and data and stored in persistent memory to run on a processor unit.

When hardware is employed in controller 304, the hardware may include one or more circuits that operate to perform the operations in performed by controller 304. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

As depicted, controller 304 also may be configured to control the operation of heating system 302. For example, controller 304 may control heating system 302 such that desired temperature 312 of air 218 is reached prior to air 218 leaving tube system 300.

Heating system 302 may be selected from one of an electric heater and other suitable types of heating systems in this illustrative example. In other illustrative examples, heating system 302 may be a gas heating system or some other suitable type of heating system, depending on the particular implementation. When heating system 302 is an electric heater, heating system 302 comprises number of heating elements 314.

In this depicted example, number of heating elements 314 may be associated with at least one of inlet 322 of engine 212, a skin of aircraft 204, tube system 300, or some other suitable structure. Number of heating elements 314 may be electrical resistors such that electrical energy is converted to heat in order to heat air 218 in tube system 300.

In this illustrative example, controller 304 may control number of heating elements 314 in heating system 302 such that desired temperature 312 of air 218 is reached. For example, controller 304 may be configured to select one or more heating elements 314 to generate heat to heat air 218 for a period of time. This heated air 222 may then be directed at surface 210 of aircraft 204. In this manner, controller 304 controls number of heating elements 314 such that icing conditions 214 from FIG. 2 at surface 210 of aircraft 204 are reduced.

In this depicted example, controller 304 also may control desired temperature 312. For instance, during different phases of flight, different desired temperatures may be realized. As an example, desired temperature 312 for air 218 during takeoff may be less than during cruising. Moreover, desired temperature 312 may change based on the environmental conditions around aircraft 204, such as atmospheric water content. In hotter environments, desired temperature 312 for air 218 may be set at a lower temperature than during icing conditions 214. In this manner, controller 304 may control heating system 302 in a variety of environments and during various phases of flight of aircraft 204.

As illustrated, tube system 300 may include number of tubes 317 and number of valves 308 associated with number of tubes 317. Number of valves 308 may be configured to control flow 306 of air 218 through number of tubes 317.

Tube 316 is one of number of tubes 317 and valve 310 is one of number of valves 308 in this illustrative example. Tube 316 may be referred to as a duct. Tube 316 may be any structure configured to carry flow 306 of air 218.

In this depicted example, tube 316 may be comprised of a number of different materials. For example, without limitation, tube 316 may be comprised of metal, a metal alloy, composite, plastic, or some other suitable type of material. The material selected for tube 316 is selected to withstand the temperature and pressure of the air 218, as well as the local environment including vibration levels and other environmental factors.

In this illustrative example, tube 316 is a structure configured to deliver air 218 to a desired location. As depicted, the desired location may be surface 210 of aircraft 204 in FIG. 2. Tubes in number of tubes 317 may be physically associated with one another to form tube system 300. When number of tubes 317 comprise ducts, tube system 300 may be referred to as a "duct system" or "ductwork."

As depicted, controller 304 may move valve 310 to control flow 306 of air 218 through tube 316. Controller 304 may move valve 310 between an open position, a closed position, a partially opened position, and other positions to provide a desired level of flow 306 of air 218. This process of moving valve 310 may be referred to as "modulating" valve 310 in some cases.

In this depicted example, nozzle 318 and sensor system 320 also may be present in anti-icing system 208. Nozzle 318 may be associated with tube system 300 and may be configured to direct flow 306 of air 218 to surface 210 of aircraft 204. In one example, nozzle 318 may be configured to direct flow 306 of air 218 into inlet 322 of engine 212. In other examples, nozzle 318 may direct flow 306 of air 218 to other surfaces of aircraft 204 including, for example, without limitation, a skin panel, a fuselage, a wing, or other suitable surfaces of aircraft 204.

As illustrated, nozzle 318 may take a variety of different forms. For example, nozzle 318 may be selected from one of a sprayer, a fan nozzle, a flat nozzle, a flat-fan nozzle, a flood nozzle, a ring nozzle, a vent, a cone nozzle, a hollow cone nozzle, a needle, or some other suitable type of nozzle. The type of nozzle selected for nozzle 318 may depend on different parameters. For example, the parameters may be selected from at least one of the type of surface 210, desired temperature 312 of air 218, the area of surface 210, or other parameters, depending on the particular implementation for nozzle 318.

In this illustrative example, sensor system 320 is associated with tube system 300 and configured to generate information 324 about air 218 flowing through tube system 300. Sensor system 320 may comprise number of sensors 326 in this illustrative example. Number of sensors 326 may be configured to generate information 324 about temperature 328 of air 218 flowing through tube system 300. Number of sensors 326 also may be configured to generate information 324 about pressure 330 of air 218 flowing through tube system 300.

As depicted, number of sensors 326 may comprise at least one of number of temperature sensors 332, number of pressure sensors 334, or other suitable types of sensors to generate information 324 about temperature 328 and pressure 330 of air 218 flowing though tube system 300. When number of temperature sensors 332 are present in sensor system 320, number of temperature sensors 332 may be located in first location 336 and second location 338 in tube system 300. In some illustrative examples, at least one temperature sensor in number of temperature sensors 332 may be located in first location 336 and at least one temperature sensor in number of temperature sensors 332 may be located second location 338.

First location 336 may be upstream of heating system 302, while second location 338 may be downstream of heating system 302 in this illustrative example. In this manner, information 324 about temperature 328 of air 218 flowing through tube system 300 may be generated prior to air 218 being heated by heating system 302 and after air 218 is heated by heating system 302.

In some illustrative examples, number of pressure sensors 334 also may be located in first location 336 and second location 338 of tube system 300 to generate information 324 about pressure 330 of air 218. Although the illustrative examples describe number of sensors 326 being placed in first location 336 and second location 338 in tube system 300, number of sensors 326 may be placed in more or fewer locations in tube system 300. Moreover, other numbers of sensors may be present in number of temperature sensors 332, number of pressure sensors 334, or both. For example, one sensor, six sensors, ten sensors, thirty sensors, or some other suitable number of sensors may be present in number of temperature sensors 332, number of pressure sensors 334, or both. These sensors may be arranged in various locations along tube system 300 to generate information 324.

After information 324 is generated by sensor system 320, information 324 is sent to controller 304. Controller 304 uses information 324 to control number of valves 308 and heating system 302. For example, after receiving information 324 about pressure 330, controller 304 may adjust valve 310 to increase or decrease pressure 330 of flow 306 of air 218 in tube system 300.

In one example, controller 304 may compare information 324 about pressure 330 to a threshold value. If pressure 330 meets or exceeds this value, controller 304 may or may not move valve 310 to a different position. If pressure 330 does not meet this value, controller 304 may move valve 310 accordingly.

In a similar fashion, controller 304 may adjust heating system 302 based on temperature 328 measured by number of temperature sensors 332. For example, controller 304 may compare temperature 328 of air 218 at first location 336 upstream of heating system 302 with temperature 328 of air 218 at second location 338 downstream of heating system 302 to set a desired level of operation of heating system 302.

In another example, controller 304 may compare temperature 328 of air 218 at second location 338 downstream of heating system 302 with desired temperature 312 for air 218. If temperature 328 of air 218 is less than desired temperature 312 of air 218, the heat generated by heating system 302 may be increased. For example, controller 304 may send more current through number of heating elements 314 to generate more heat in order to heat air 218.

If temperature 328 of air 218 is greater than desired temperature 312 of air 218, the heat generated by heating system 302 may be reduced. For example, current sent through one or more of number of heating elements 314 may be reduced. As a result, controller 304 may dynamically control the operation of anti-icing system 208 during the operation of aircraft 204 in a desired manner such that icing conditions 214 at surface 210 of aircraft 204 in FIG. 2 are reduced.

In some illustrative examples, controller 304 may be implemented in computer system 309. Computer system 309 may be one or more computers in aircraft 204. When more than one computer is present in computer system 309, those computers may communicate with each other using a communications medium such as a network.

In this instance, computer system 309 also may include other functions for the aircraft such as navigation, environmental controls, and other suitable functions. In still other illustrative examples, controller 304 may be a separate component implemented in a device that is not part of computer system 309.

Although the illustrative examples for anti-icing system 208 are described with respect to aircraft 204, an illustrative embodiment may be applied to other types of platforms. Platform 202 may be, for example, without limitation, a mobile platform, a stationary platform, a land-based structure, an aquatic-based structure, and a space-based structure. More specifically, platform 202 may be a surface ship, a tank, a personnel carrier, a train, a spacecraft, a space station, a satellite, a submarine, an automobile, a power plant, a bridge, a dam, a house, a windmill, a manufacturing facility, a building, or other suitable platforms.

The illustration of anti-icing system 208 in FIG. 2 and FIG. 3 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some examples, tube system 300 may extend within a skin of aircraft 204. In this case, tube system 300 with heating system 302 may be configured to heat the skin of aircraft 204. The skin may be an inner skin or an outer skin of aircraft 204 in these illustrative examples.

In other illustrative examples, heating system 302 may be arranged along tube system 300 in another location other than at the end of tube system 300 opposite portion 220 of engine 212, as described herein. For example, air 218 may be heated by heating system 302 directly after being received by tube system 300 from portion 220 of engine 212. In still other examples, more than one heating system 302 may be present in anti-icing system 208 to heat air 218 in various locations along tube system 300.

Figure 4:
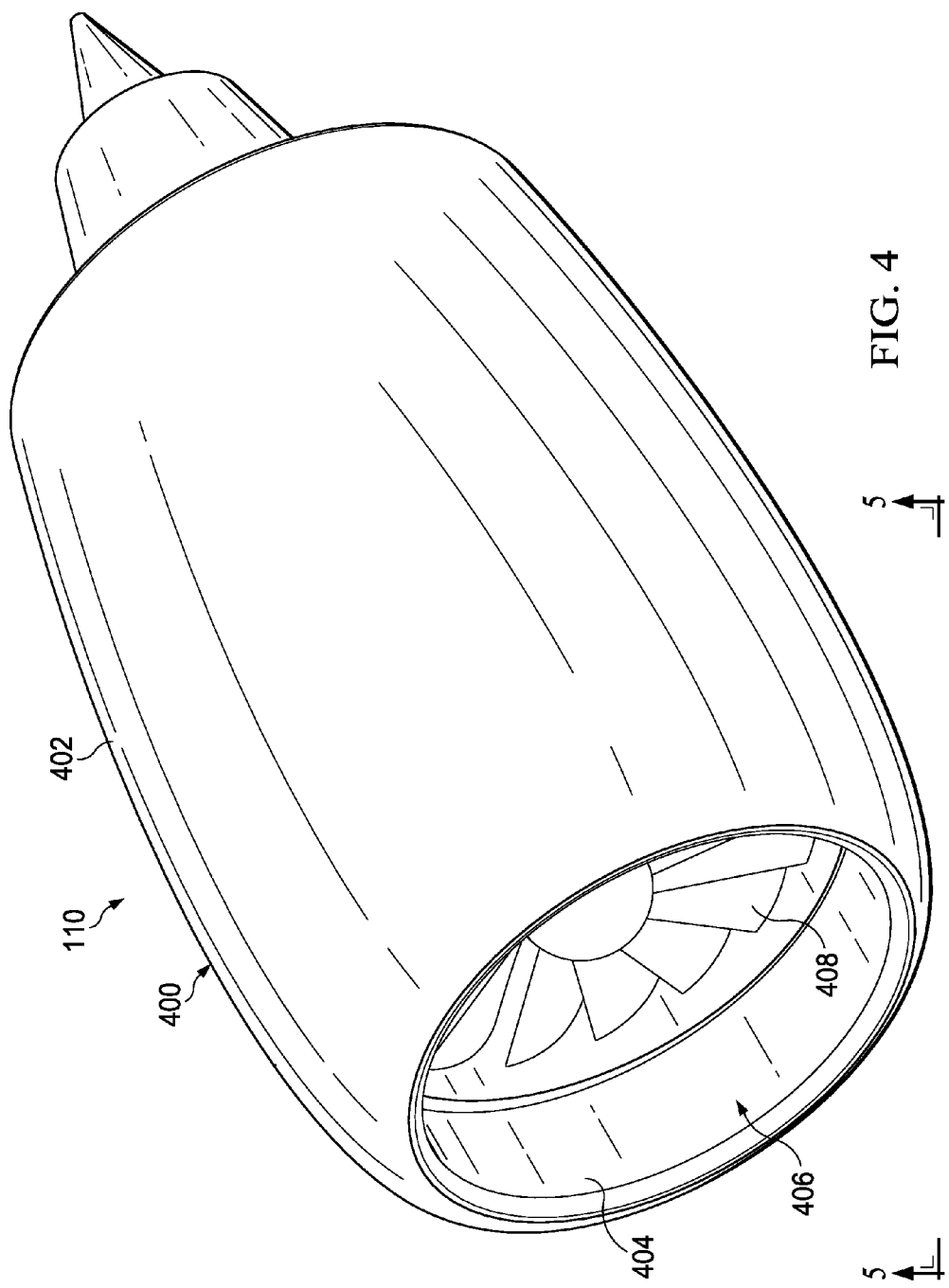
FIG. 4 is an illustration of an isometric view of an engine with an anti-icing system in accordance with an illustrative embodiment.

With reference now to FIG. 4, an illustration of an isometric view of an engine with an anti-icing system is depicted in accordance with an illustrative embodiment. In this depicted example, a more detailed view of engine 110 from aircraft 100 from FIG. 1 is shown. Engine 110 is a gas turbine engine in this illustrative example.

As depicted, engine 110 includes housing 400. Housing 400 may be referred to as a nacelle in some examples. Housing 400 may include surface 402 and surface 404. Surface 402 may be an outer skin of engine 110, while surface 404 may also be an outer skin of engine 110 in these illustrative examples.

Both surface 402 and surface 404 may be exposed to the environment around aircraft 100 in these illustrative examples. In other words, both surface 402 and surface 404 may be examples of implementations for outer surface 209 in FIG. 2.

In this view, inlet 406 and fan 408 are shown in engine 110. Inlet 406 is a portion of engine 110 that receives air. Fan 408 is configured to move the air to a compressor in engine 110.

In this illustrative example, anti-icing system 208 may be arranged within housing 400 of engine 110 to direct air 218 into inlet 406 such that icing conditions 214 on surface 404, surface 402, or a combination thereof are reduced. In this manner, anti-icing system 208 may be used to prevent ice 216 in FIG. 2 from forming on surface 404, surface 402, or both.

Figure 5:
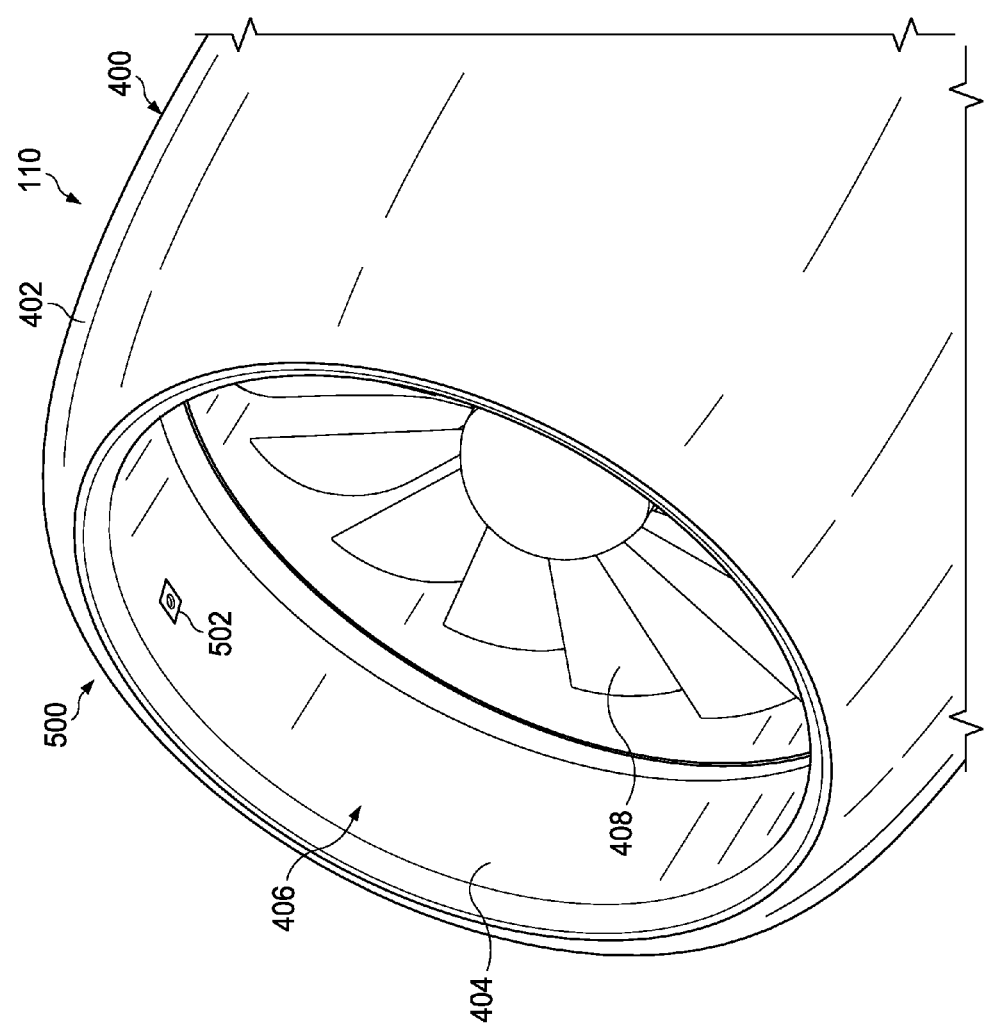
FIG. 5 is an illustration of an engine with an anti-icing system in accordance with an illustrative embodiment.

In FIG. 5, an illustration of an engine with an anti-icing system is depicted in accordance with an illustrative embodiment. In this illustrative example, a closer view of engine 110 is shown in the direction of lines 5-5 in FIG. 4.

As depicted, engine 110 includes anti-icing system 500. Anti-icing system 500 is one example of one implementation for anti-icing system 208 shown in block form in FIG. 2 and FIG. 3.

In this illustrative example, housing 400 of engine 110 includes opening 502 in surface 404 of inlet 406. Opening 502 may be an opening through which air 218 is directed by anti-icing system 500. In particular, anti-icing system 500 may direct air 218 out of opening 502 in surface 404 of inlet 406 to reduce icing conditions 214 at surface 404 of inlet 406.

In other illustrative examples, air 218 may not be directed out of opening 502. Rather, air 218 may be directed toward an inner surface (not shown) in the interior of inlet 406. In this case, air 218 is directed to the inner surface of the interior of inlet 406 such that heat is conducted to surface 404 of inlet 406 to prevent ice 216 from forming on inlet 406. The components within anti-icing system 500 may be seen in greater detail with reference to FIGS. 6-10.

Figure 6:
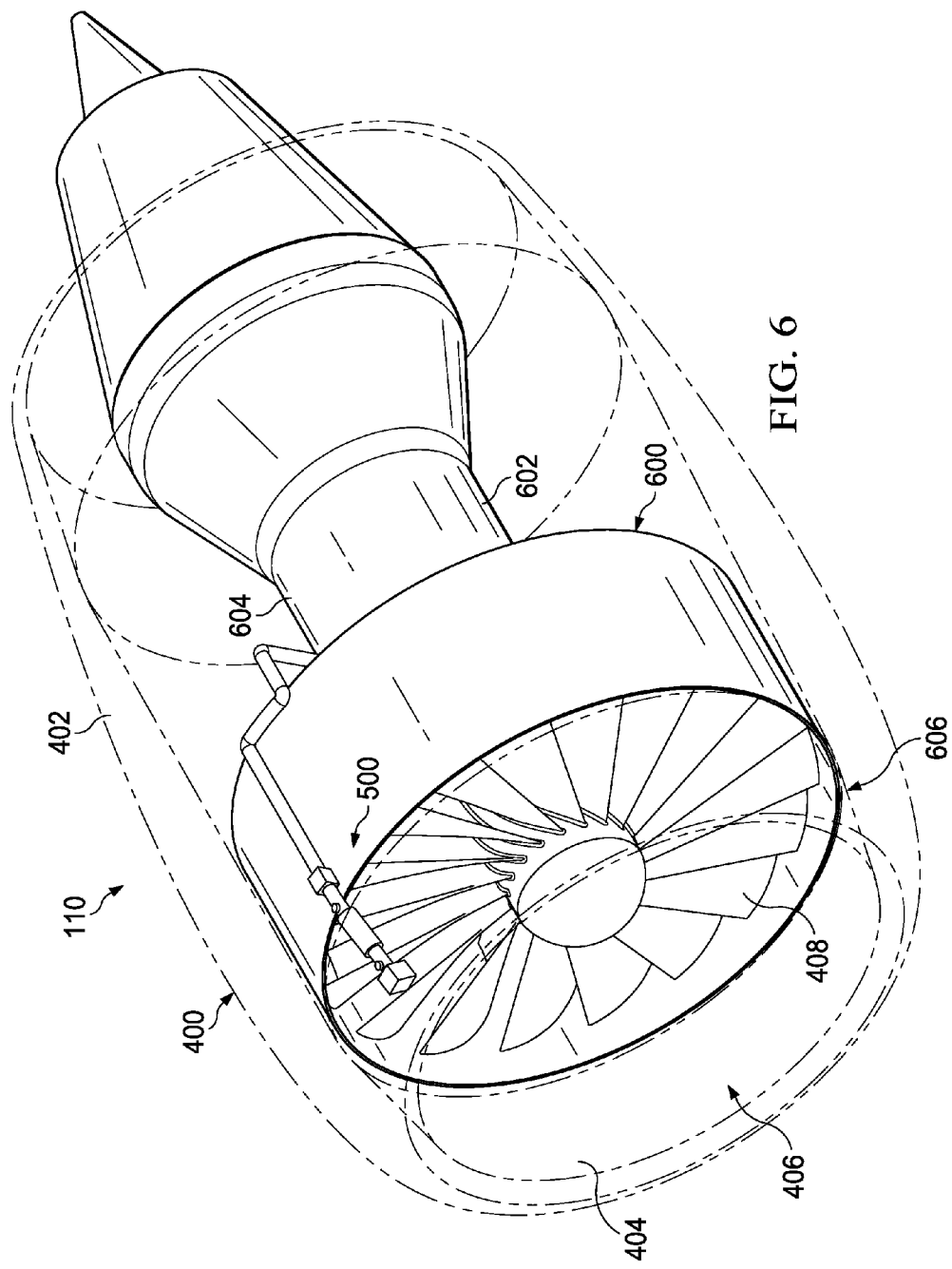
FIG. 6 is another illustration of an engine with an anti-icing system in accordance with an illustrative embodiment.

Turning now to FIG. 6, another illustration of an engine with an anti-icing system is depicted in accordance with an illustrative embodiment. In this illustrative example, housing 400 of engine 110 from FIG. 5 is shown in phantom to expose the components in anti-icing system 500.

As depicted, engine 110 comprises fan compartment 600 and core compartment 602. Fan compartment 600 includes fan 408, while core compartment 602 includes compressor 604 as well as other components. Compressor 604 is configured to increase the pressure of the air in engine 110 in a desired manner in these illustrative examples. Compressor 604 is located toward the front of core compartment 602 in engine 110. Other components, such as wiring, brackets, and other structures, are not shown to avoid obstructing the illustration of anti-icing system 500 within engine 110.

In this illustrative example, compressor 604 includes a number of stages in which work is performed on air 218. These stages may be a first stage, a second stage, a third stage, and other suitable stages. Work, as used herein, may refer to applying a force on air 218. For example, work may include compressing air 218, adding fuel to air 218 for combustion, heating air 218, or performing other types of work on air 218. Air 218 flows from the first stage to the third stage when flowing through compressor 604. When in the first stage, air 218 is at a lower pressure than when in the third stage. In other words, less work has been performed on air 218 in the first stage than has been performed on air 218 in the third stage.

In this depicted example, inner surface 606 of inlet 406 also may be seen. Inner surface 606 of inlet 406 is shown in phantom in this view of engine 110. Inner surface 606 is an inner skin of inlet 406. Anti-icing system 500 may direct air 218 onto inner surface 606 in one illustrative example. In another illustrative example, air 218 is directed out of opening 502 in FIG. 5 toward surface 404 of inlet 406, as described above.

Figure 7:
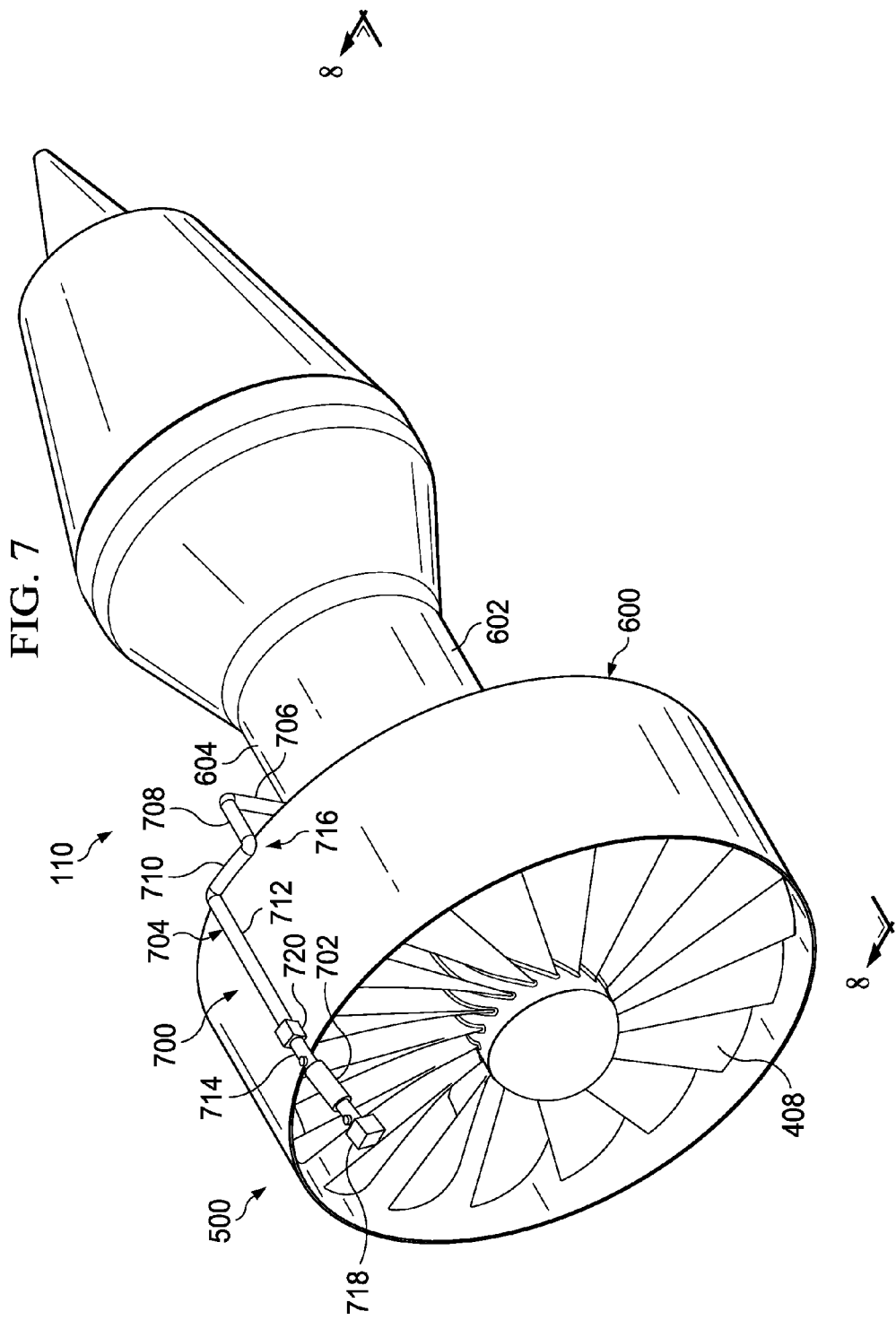
FIG. 7 is yet another illustration of an engine with an anti-icing system in accordance with an illustrative embodiment.

With reference next to FIG. 7, yet another illustration of an engine with an anti-icing system is depicted in accordance with an illustrative embodiment. In this depicted example, housing 400 of engine 110 from FIG. 6 has been removed.

As illustrated, anti-icing system 500 includes tube system 700 and heating system 702. In this example, tube system 700 may be comprised of number of tubes 704. In particular, tube system 700 may include tube 706, tube 708, tube 710, tube 712, and tube 714 in number of tubes 704.

Number of tubes 704 may be arranged such that air 218 from FIG. 2 may flow through number of tubes 704 in a desired manner. For example, number of tubes 704 may be arranged such that tube system 700 does not interfere with components within engine 110. As another example, number of tubes 704 may be arranged such that a desired pressure of air 218 may flow out of a nozzle in the direction of inlet 406, seen in FIG. 4 and FIG. 5, of engine 110. The length and number of tubes used for tube system 700 may be designed for these and other purposes.

Each of number of tubes 704 may be connected to each other using number of fittings 716. Number of fittings 716 may be configured to seal number of tubes 704 to one another such that air 218 does not pass through the interface between one tube and another tube.

In this illustrative example, heating system 702 is arranged along tube 714 in tube system 700. In particular, heating system 702 is arranged such that heating system 702 surrounds a portion of tube 714 close to nozzle 718. A number of heating elements (not shown) in heating system 702 are configured to heat air 218 flowing through tube 714 in tube system 700 such that desired temperature 312 in FIG. 3 for air 218 is reached when flowing out of nozzle 718 through opening 502 into inlet 406 of engine 110, as shown in FIG. 5.

In some illustrative examples, tube system 700 may be associated with one or more support structures 720. Support structures 720 may be configured to provide support for number of tubes 704 and, in some cases, secure number of tubes 704 to surface 404 of housing 400 in FIGS. 4-6, fan compartment 600, core compartment 602, or some other suitable structure.

Figure 8:
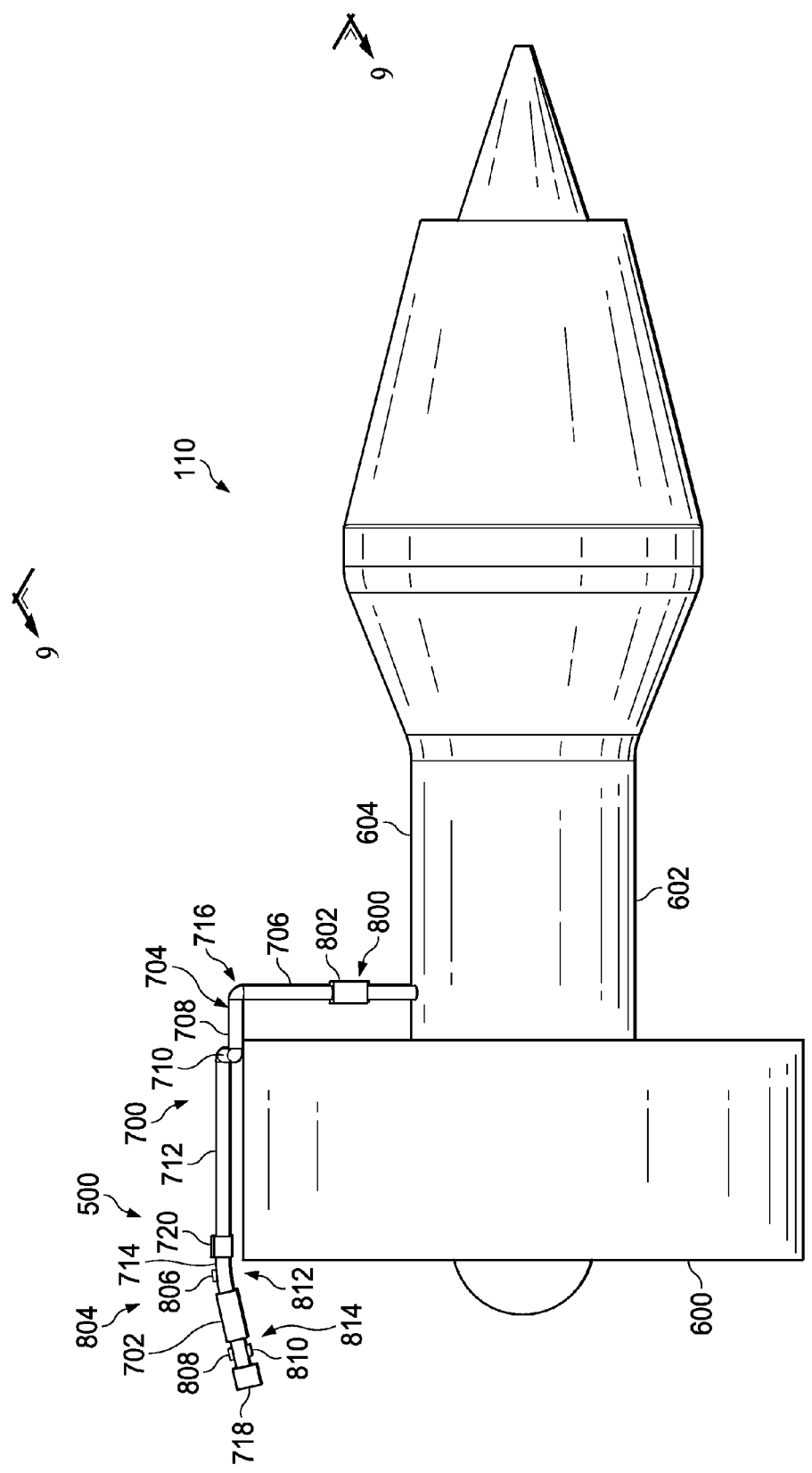
FIG. 8 is an illustration of a side view of an engine with an anti-icing system in accordance with an illustrative embodiment.

In FIG. 8, an illustration of a side view of an engine with an anti-icing system is depicted in accordance with an illustrative embodiment. In this depicted example, engine 110 is shown in the direction of lines 8-8 in FIG. 7.

In this illustrative example, anti-icing system 500 includes number of valves 800. As shown in this illustrative example, number of valves 800 are associated with tube 706 in number of tubes 704. Valve 802 in number of valves 800 may be configured to move between an open position, a closed position, a partially open position, and other positions to control the flow of air 218 from FIG. 2 through tube system 700.

In this depicted example, controller 304 (not shown) may move valve 802 in number of valves 800 to control flow 306 from FIG. 3 of air 218 through tube 706 in tube system 700. For example, controller 304 may move valve 802 into a position such that a desired amount of air 218 passes through valve 802 into tube 706. Moreover, controller 304 may move valve 802 into a position such that air 218 leaves nozzle 718 at a desired pressure to reduce icing conditions 214 at surface 404 of inlet 406 of engine 110 in FIG. 4.

As depicted, tube 706 is associated with core compartment 602 of engine 110. In this illustrative example, air 218 may be received by tube 706 from compressor 604 in core compartment 602 of engine 110. As shown, tube 706 is connected to compressor 604 toward the front portion of compressor 604. This front portion may be a lower stage, such as a first stage or a second stage of compressor 604. As a result, less work has been performed on air 218 than if air 218 had been taken from a portion of compressor 604 further away from fan compartment 600. Accordingly, fuel and power savings may be realized with the use of anti-icing system 500.

In this illustrative example, anti-icing system 500 also includes sensor system 804. Sensor system 804 includes sensor 806, sensor 808, and sensor 810. In this depicted example, sensor 806 and sensor 808 are temperature sensors, while sensor 810 is a pressure sensor. Each of sensor 806, sensor 808, and sensor 810 may extend into tube system 300 in these illustrative examples.

As depicted, sensor 806 is located in first location 812 of tube system 700 to generate information about a temperature of air 218 before being heated by heating system 702. In this illustrative example, sensor 808 is located in second location 814 of tube system 700 to generate information about a temperature of air 218 after being heated by heating system 702 but before being directed into inlet 406 of engine 110. Information about the temperature at each of first location 812 and second location 814 is then sent to controller 304. This information may be sent wirelessly or using a wired connection.

In this illustrative example, sensor 810 is also located in second location 814 of tube system 700. Sensor 810 generates information about a pressure of air 218 at second location 814 of tube system 700. Sensor 810 then sends the information to controller 304.

In response to information sent by at least one of sensor 806, sensor 808, and sensor 810, controller 304 may adjust the position of valve 310 in tube 706, heating system 702, or a combination of the two to provide a desired temperature or pressure for air 218 leaving nozzle 718.

Although sensor system 804 depicted in FIG. 8 shows two temperature sensors and one pressure sensor, other numbers of sensors in various combinations may be present in sensor system 804. Further, other types of sensors other than temperature and pressure sensors also may be present in sensor system 804 in some examples. In still other illustrative examples, anti-icing system 500 may operate without the use of sensor system 804.

Figure 9:
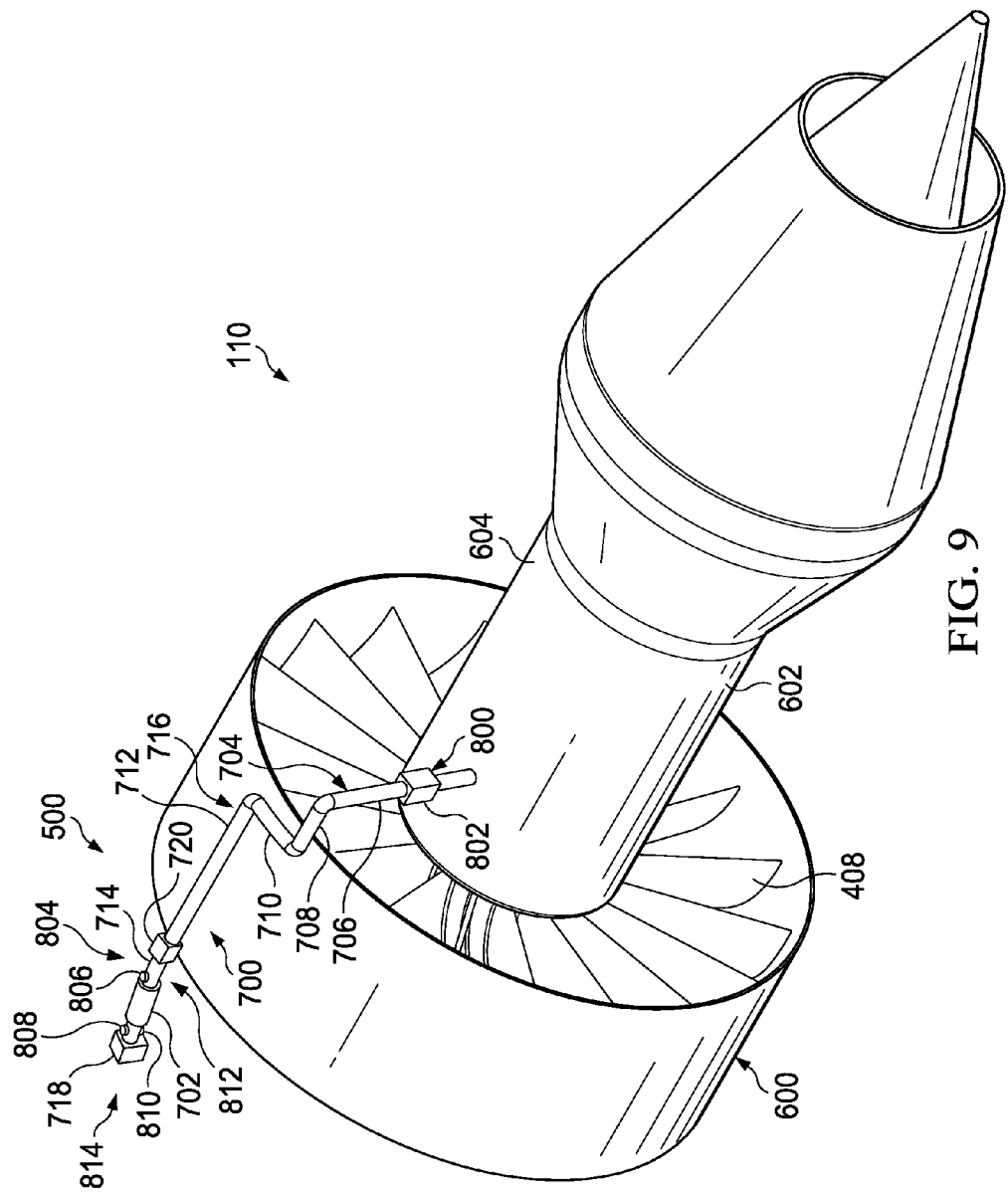
FIG. 9 is an illustration of a perspective view of an engine with an anti-icing system in accordance with an illustrative embodiment.

With reference next to FIG. 9, an illustration of a perspective view of an engine with an anti-icing system is depicted in accordance with an illustrative embodiment. In this depicted example, anti-icing system 500 is shown in the direction of lines 9-9 in FIG. 8.

Figure 10:
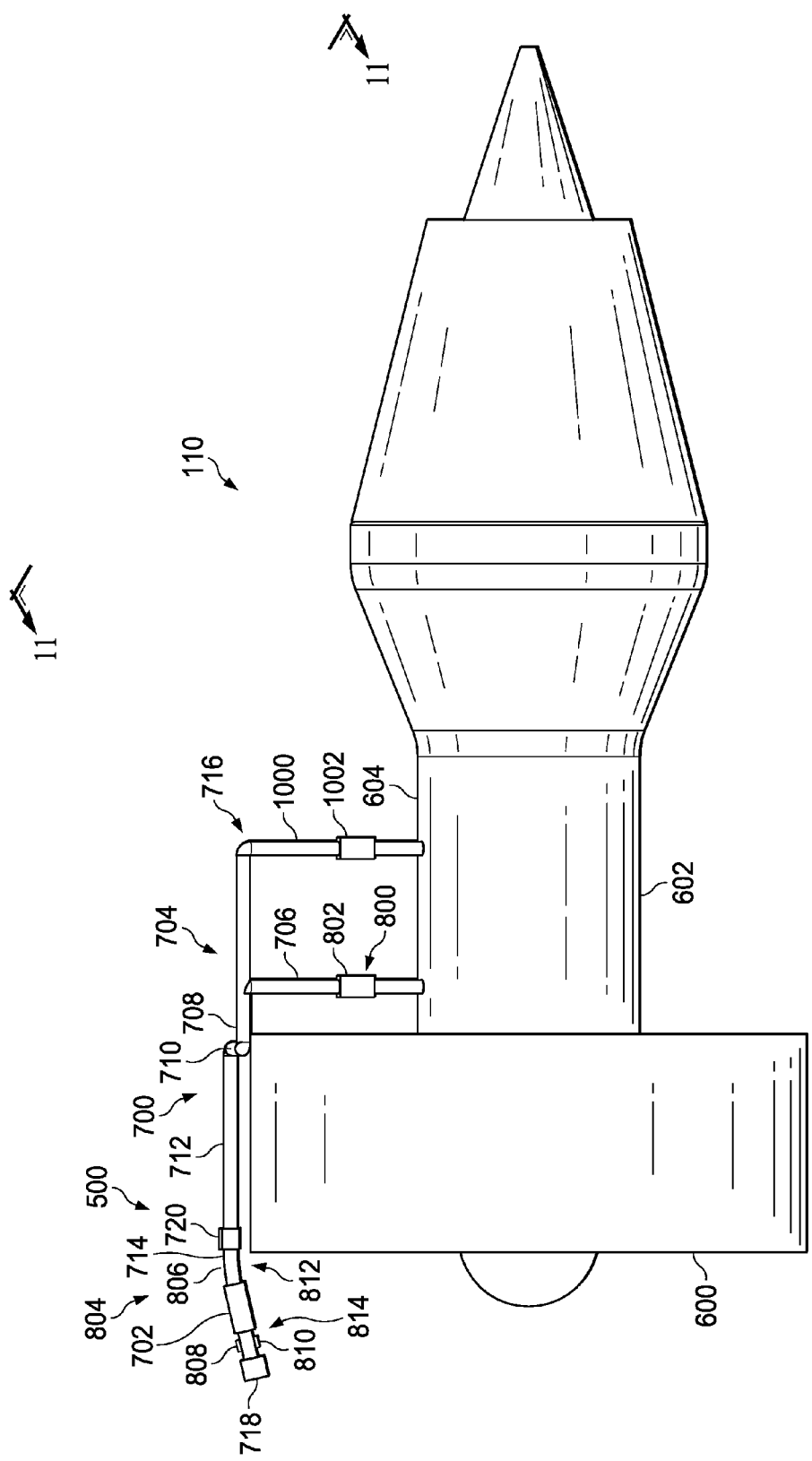
FIG. 10 is an illustration of an engine with an anti-icing system in accordance with an illustrative embodiment.

Turning now to FIG. 10, an illustration of an engine with an anti-icing system is depicted in accordance with an illustrative embodiment. In this depicted example, tube 1000 and valve 1002 have been added to anti-icing system 500 in engine 110.

As illustrated, air 218 from FIG. 2 is received from at least one of valve 802 or valve 1002. In other words, air 218 may be received in tube 706 though valve 802, air 218 may be received in tube 1000 through valve 1002, or a combination thereof. Controller 304 may control operation of valve 802 and valve 1002. One or more of valve 802 and valve 1002 may be opened, closed, partially opened, or moved to another position at the same time or different times. In some examples, valve 802 and valve 1002 may be moved in a desired manner.

In this depicted example, tube 1000 is connected to compressor 604 at a location further away from fan compartment 600 than tube 706. For instance, tube 1000 may be connected to compressor 604 to receive air 218 from compressor 604 at a second stage or third stage. As a result, more work may have been performed on air 218 received in tube 1000. Accordingly, air 218 received in tube 1000 through valve 1002 has a higher temperature, pressure, or both temperature and pressure than air received in tube 706 through valve 802.

In this illustrative example, anti-icing system 500 uses air 218 from two different portions of compressor 604 to reduce icing conditions 214 in FIG. 2 at surface 404 of inlet 406 of engine 110 in FIG. 4 in a desired manner. In other illustrative examples, additional tubes and valves may be present in anti-icing system 500. In this manner, controller 304 in FIG. 3 may dynamically control the flow of air 218 through these valves as described above.

Figure 11:
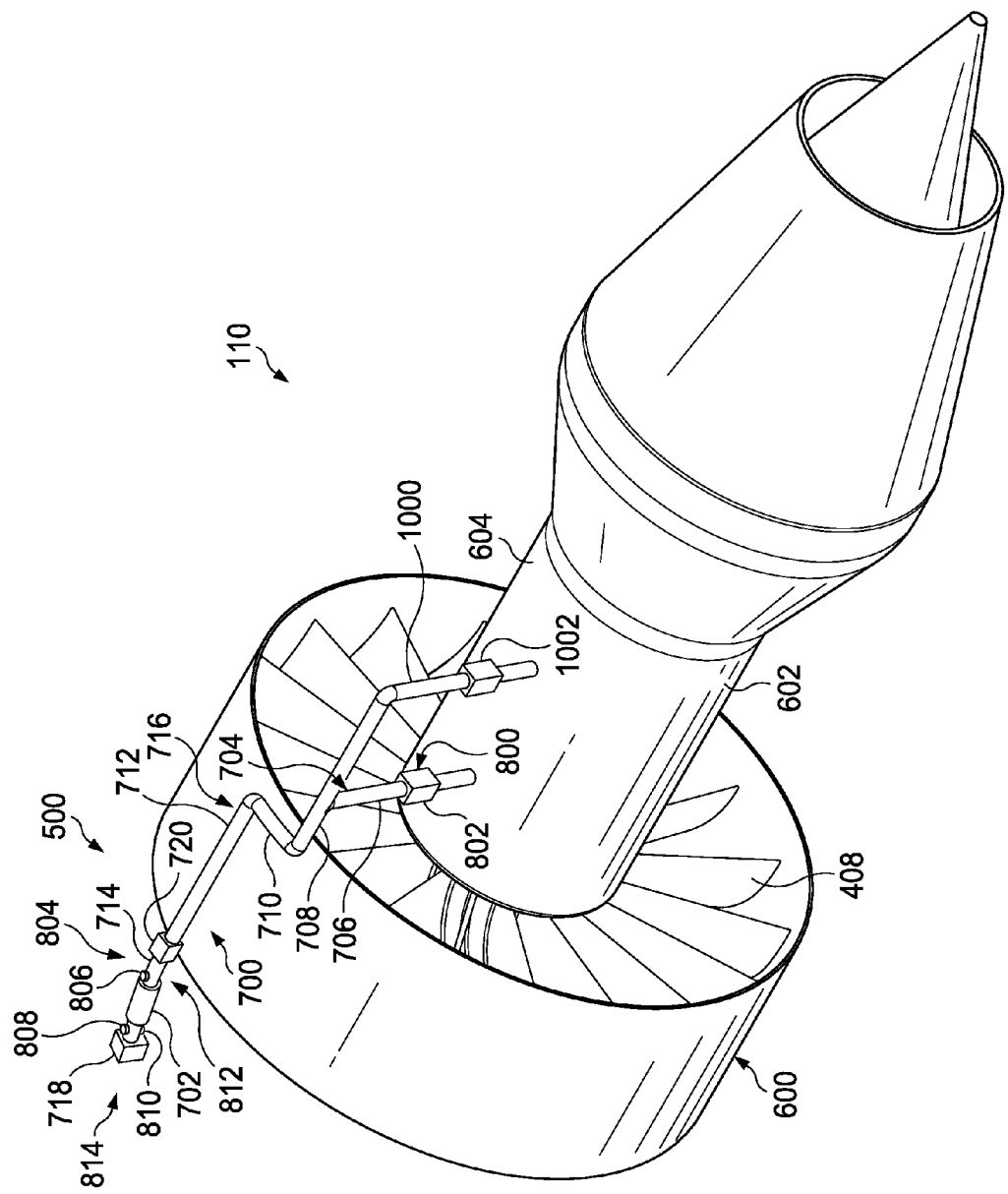
FIG. 11 is an illustration of a perspective view of an engine with an anti-icing system in accordance with an illustrative embodiment.

In FIG. 11, an illustration of a perspective view of an engine with an anti-icing system is depicted in accordance with an illustrative embodiment. In this depicted example, anti-icing system 500 in engine 110 is shown in the direction of lines 11-11 in FIG. 10.

Although the illustrative embodiments in FIG. 10 and FIG. 11 depict air 218 from FIG. 2 being received from two different portions of compressor 604, these illustrations are not meant to limit the manner in which an illustrative embodiment may be implemented. In other illustrative examples, air 218 may be received from one or more tubes in the same portion of compressor 604, or in another suitable manner, depending on the particular implementation. For example, tube 706 with valve 802 and tube 1000 with valve 1002 may be located in the same portion of compressor 604 to provide air 218 for use by anti-icing system 500 in some implementations of an illustrative embodiment.

Figure 12:
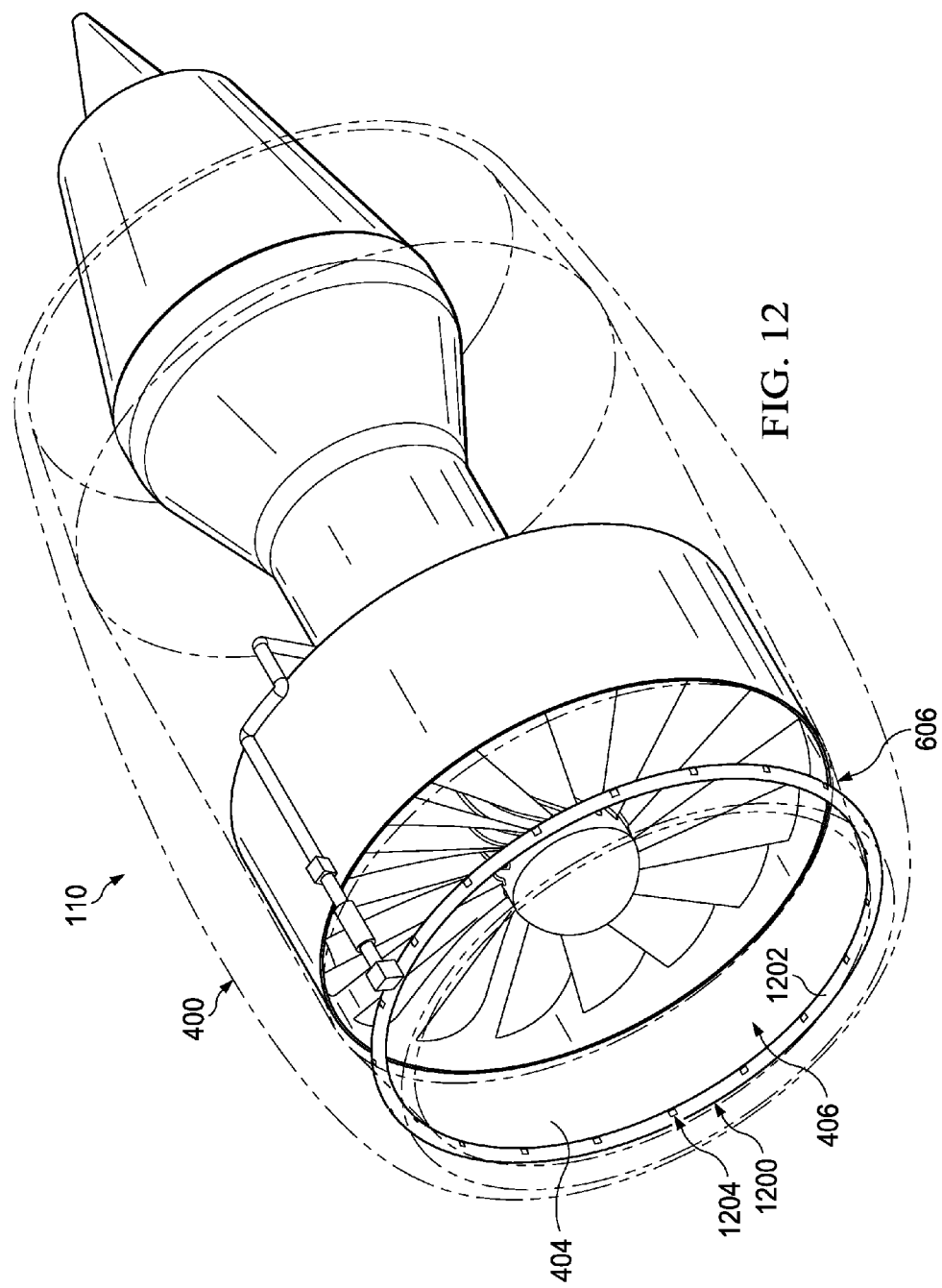
FIG. 12 is an illustration of an engine with an anti-icing system in accordance with an illustrative embodiment.

With reference now to FIG. 12, an illustration of an engine with an anti-icing system is depicted in accordance with an illustrative embodiment. In this illustrative example, engine 110 from FIG. 4 is shown with anti-icing system 1200. Anti-icing system 1200 may be another example of one implementation for anti-icing system 208 shown in block form in FIG. 2 and FIG. 3.

In this depicted example, housing 400 of engine 110 is shown in phantom to expose the components of anti-icing system 1200. These components are similar to the components of anti-icing system 500 shown and described with respect to FIGS. 5-11.

As depicted, anti-icing system 1200 includes ring 1202. Ring 1202 is configured to direct air 218 from FIG. 2 within inlet 406 of engine 110. In this example, ring 1202 may be configured to extend along inner surface 606 of inlet 406 of engine 110. In one example, ring 1202 may touch inner surface 606 of inlet 406. In other examples, ring 1202 may be arranged a desired distance from inner surface 606 of inlet 406.

In this depicted example, ring 1202 includes number of openings 1204. Air 218 is released within inlet 406 of engine 110 through number of openings 1204 in ring 1202 such that icing conditions 214 in FIG. 2 at surface 404 of inlet 406 are reduced by heat conducting through inlet 406 to surface 404.

Figure 13:
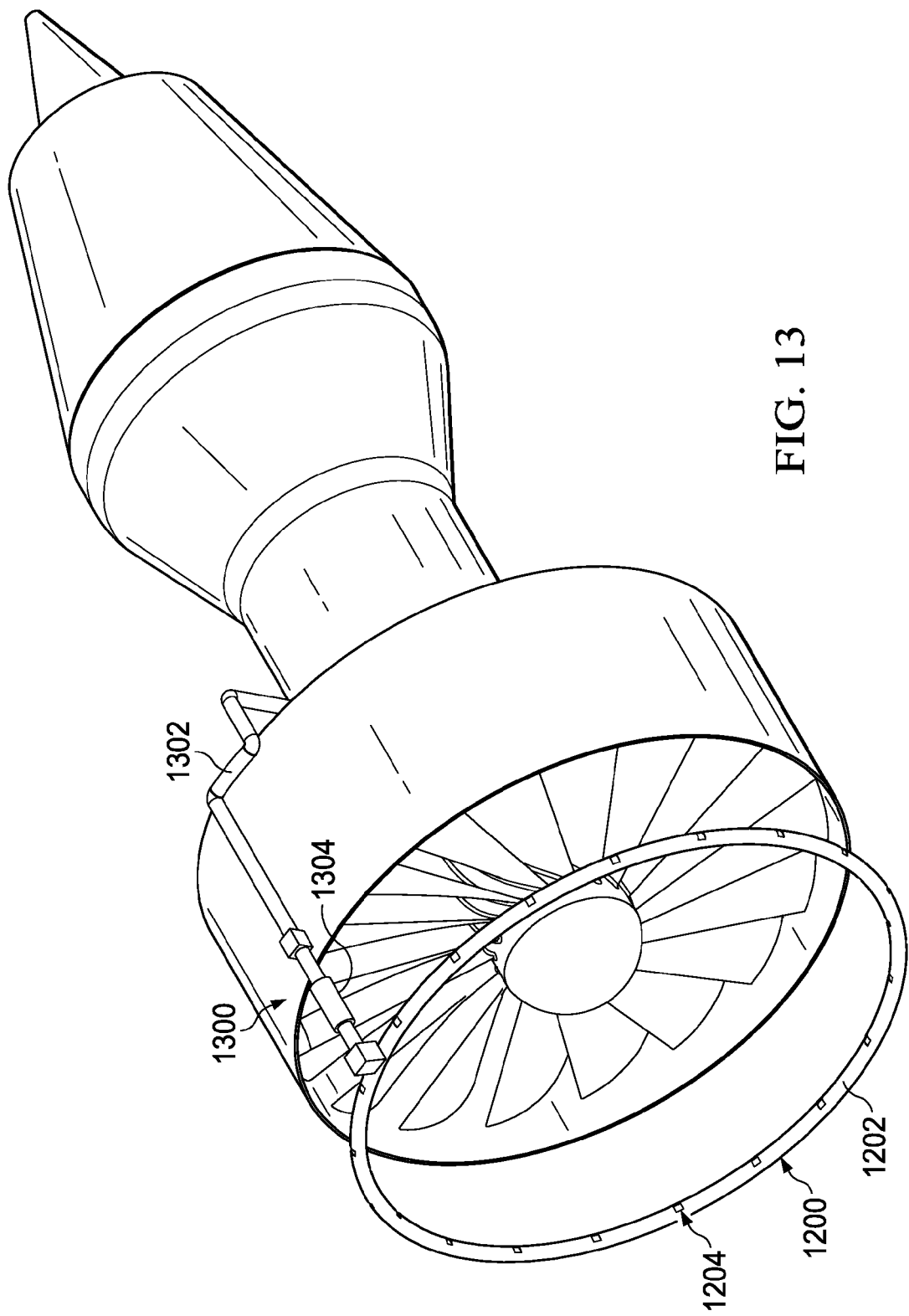
FIG. 13 is another illustration of an engine with an anti-icing system in accordance with an illustrative embodiment.

Turning next to FIG. 13, another illustration of an engine with an anti-icing system is depicted in accordance with an illustrative embodiment. In this depicted example, housing 400 of engine 110 from FIG. 12 has been removed. In this illustrative example, anti-icing system 1200 includes sensor system 1300, tube system 1302, and heating system 1304. Sensor system 1300, tube system 1302, and heating system 1304 operate as described above.

As illustrated, the temperature, pressure, or both temperature and pressure of air 218 flowing through ring 1202 in anti-icing system 1200 may be different than the temperature, pressure, or temperature and pressure of air 218 flowing through anti-icing system 500 shown in FIGS. 5-11.

In this illustrative example, sensor system 1300 in anti-icing system 1200 is used to generate information about the temperature and pressure of air 218 flowing through tube system 1302 of anti-icing system 1200. In turn, controller 304 (not shown) may use the information to control heating system 1304, a valve system (not shown), or a combination thereof to provide a desired flow of air 218 out of number of openings 1204 in ring 1202.

Figure 14:
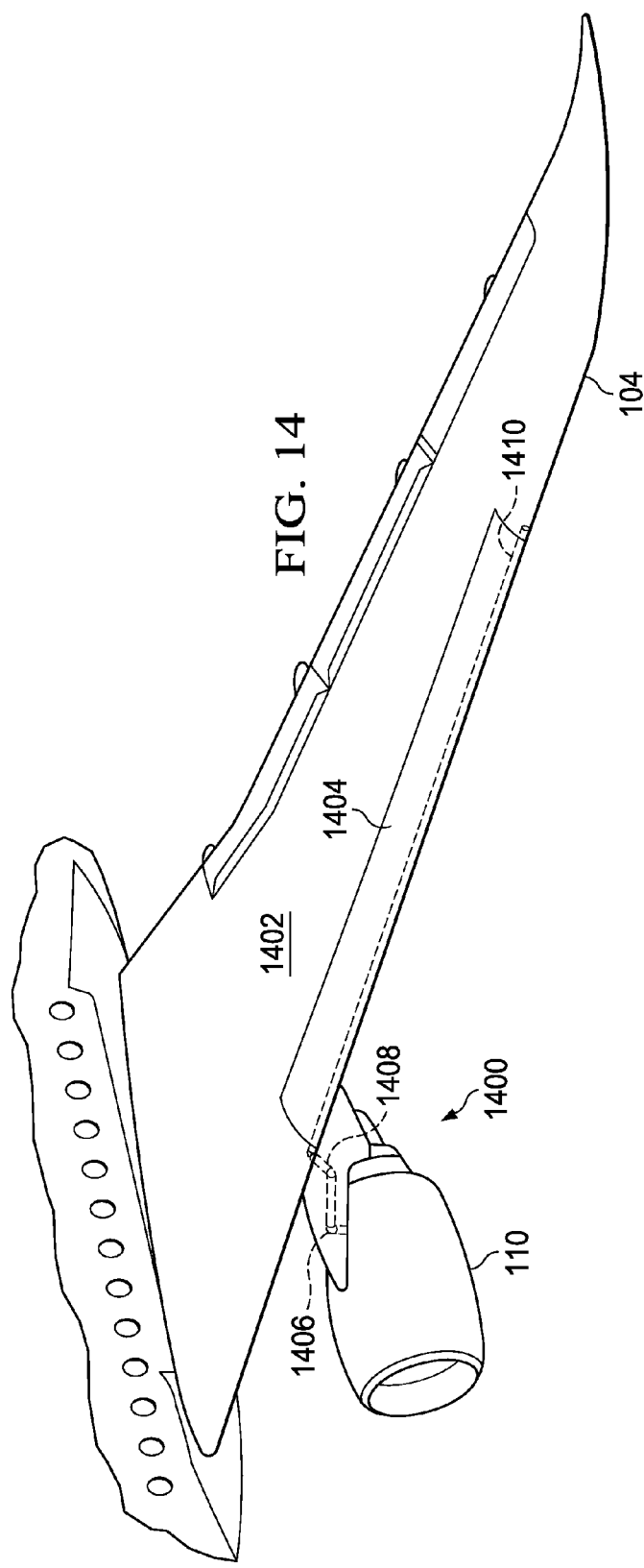
FIG. 14 is an illustration of a wing with an anti-icing system in accordance with an illustrative embodiment.

Referring now to FIG. 14, an illustration of a wing with an anti-icing system is depicted in accordance with an illustrative embodiment. In this depicted example, wing 104 and engine 110 in aircraft 100 from FIG. 1 are shown.

As illustrated, wing 104 and engine 110 have anti-icing system 1400. Anti-icing system 1400 is configured to reduce icing conditions 214 from FIG. 2 on skin 1402 of aircraft 100. In other words, anti-icing system 1400 is configured to prevent ice from forming on skin 1402 of wing 104, to melt ice formed on skin 1402 of wing 104, or a combination thereof. In this illustrative example, anti-icing system 1400 may reduce icing conditions 214 on control surface 1404 of wing 104.

In this depicted example, anti-icing system 1400 comprises tube system 1406, heating system 1408, and vent 1410. Tube system 1406 is associated with engine 110 and extends within skin 1402 of aircraft 100. Tube system 1406 with heating system 1408 is configured to heat skin 1402 of wing 104 of aircraft 100. Vent 1410 directs air 218 to control surface 1404 such that icing conditions 214 at control surface 1404 are reduced.

The illustrations of anti-icing system 500 in FIGS. 5-11, anti-icing system 1200 in FIG. 12 and FIG. 13, and anti-icing system 1400 in FIG. 14 are not meant to imply physical or architectural limitations to the manner in which an illustrative embodiment may be implemented. Other components in addition to or in place of the ones illustrated may be used. Some components may be optional.

The different components shown in FIG. 1 and FIGS. 4-14 may be illustrative examples of how components shown in block form in FIG. 2 and FIG. 3 can be implemented as physical structures. Additionally, some of the components in FIGS. 4-14 may be combined with components in FIG. 1 and FIG. 2, used with components in FIG. 1 and FIG. 2, or a combination of the two.

Figure 15:
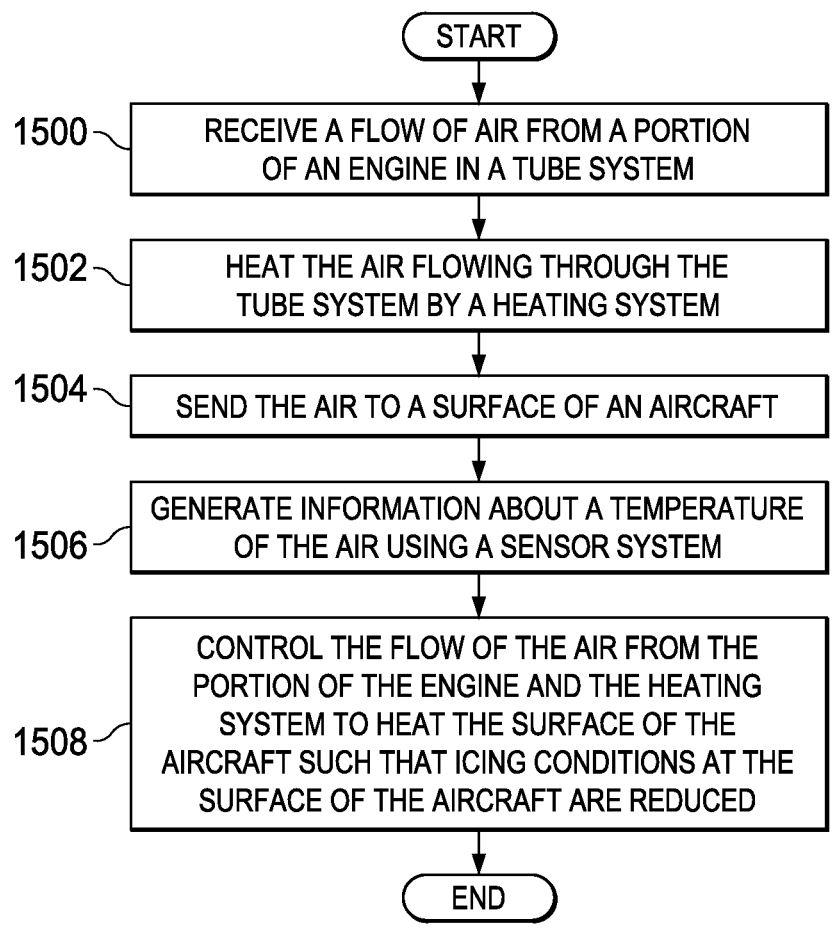
FIG. 15 is an illustration of a flowchart of a process for heating a surface of an aircraft in accordance with an illustrative embodiment.

With reference now to FIG. 15, an illustration of a flowchart of a process for heating a surface of an aircraft is depicted in accordance with an illustrative embodiment. The process illustrated in FIG. 15 may be implemented by anti-icing system 208 shown in block form in FIG. 2 and FIG. 3.

The process begins by receiving a flow of air from a portion of an engine in a tube system (operation 1500). For example, flow 306 of air 218 from portion 220 of engine 212 may be received by tube system 300 in anti-icing system 208 in FIG. 3. Air 218 may be received by a single tube or a number of tubes and may then flow through tube system 300.

Next, the air flowing through the tube system is heated by a heating system (operation 1502). In this depicted example, air 218 flowing through tube system 300 is heated by heating system 302.

The air is then sent to a surface of an aircraft (operation 1504). For example, air 218 is sent to surface 210 of aircraft 204. In this example, flow 306 of air 218 may be directed at surface 210 through nozzle 318.

Thereafter, the process then generates information about a temperature of the air using a sensor system (operation 1506). For example, information 324 is generated about temperature 328 of air 218 using sensor system 320.

The process then controls the flow of the air from the portion of the engine and the heating system to heat the surface of the aircraft such that icing conditions at the surface of the aircraft are reduced (operation 1508), with the process terminating thereafter. In this illustrative example, controller 304 controls flow 306 of air 218 from portion 220 of engine 212. Controller 304 may control flow 306 of air 218 through tube 316 of tube system 300 by moving valve 310.

In this illustrative example, controller 304 also controls heating system 302 to heat surface 210 of aircraft 204 such that icing conditions 214 at surface 210 of aircraft 204 are reduced. Controller 304 may control temperature 328 of air 218, which may be increased or decreased using the heating system 302.

Illustrative embodiments of the disclosure may be described in the context of aircraft manufacturing and service method 1600 as shown in FIG. 16 and aircraft 1700 as shown in FIG. 17. Aircraft 100 in FIG. 1 is one example of one implementation of aircraft 100 as shown in FIG. 17.

Turning first to FIG. 16, an illustration of a block diagram of an aircraft manufacturing and service method is depicted in accordance with an illustrative embodiment. During preproduction, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 take place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of a block diagram of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 may include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. In particular, anti-icing system 208 from FIG. 2 may be employed during one or more stages of aircraft manufacturing and service method 1600. For example, without limitation, anti-icing system 208 from FIG. 2 may be used during in service 1612 or some other stage of aircraft manufacturing and service method 1600.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612 and/or during maintenance and service 1614 in FIG. 16. The use of a number of the different illustrative embodiments may substantially expedite the assembly of and/or reduce the cost of aircraft 1700.

Turning now to FIG. 18, an illustration of a block diagram of a data processing system is depicted in accordance with an illustrative embodiment. Data processing system 1800 may be used to implement one or more computers in computer system 309 in FIG. 3. As depicted, data processing system 1800 includes communications framework 1802, which provides communications between processor unit 1804, storage devices 1816, communications unit 1810, input/output unit 1812, and display 1814. In some cases, communications framework 1802 may be implemented as a bus system.

Processor unit 1804 is configured to execute instructions for software to perform a number of operations. Processor unit 1804 may comprise a number of processors, a multi-processor core, and/or some other type of processor, depending on the implementation. In some cases, processor unit 1804 may take the form of a hardware unit, such as a circuit system, an application specific integrated circuit (ASIC), a programmable logic device, or some other suitable type of hardware unit.

Instructions for the operating system, applications, and/or programs run by processor unit 1804 may be located in storage devices 1816. Storage devices 1816 may be in communication with processor unit 1804 through communications framework 1802. As used herein, a storage device, also referred to as a computer readable storage device, is any piece of hardware capable of storing information on a temporary and/or permanent basis. This information may include, but is not limited to, data, program code, and/or other information.

Memory 1806 and persistent storage 1808 are examples of storage devices 1816. Memory 1806 may take the form of, for example, a random access memory or some type of volatile or non-volatile storage device. Persistent storage 1808 may comprise any number of components or devices. For example, persistent storage 1808 may comprise a hard drive, a flash memory, a rewritable optical disk, a rewritable magnetic tape, or some combination of the above. The media used by persistent storage 1808 may or may not be removable.

Communications unit 1810 allows data processing system 1800 to communicate with other data processing systems and/or devices. Communications unit 1810 may provide communications using physical and/or wireless communications links.

Input/output unit 1812 allows input to be received from and output to be sent to other devices connected to data processing system 1800. For example, input/output unit 1812 may allow user input to be received through a keyboard, a mouse, and/or some other type of input device. As another example, input/output unit 1812 may allow output to be sent to a printer connected to data processing system 1800.

Display 1814 is configured to display information to a user. Display 1814 may comprise, for example, without limitation, a monitor, a touch screen, a laser display, a holographic display, a virtual display device, and/or some other type of display device.

In this illustrative example, the processes of the different illustrative embodiments may be performed by processor unit 1804 using computer-implemented instructions. These instructions may be referred to as program code, computer usable program code, or computer readable program code and may be read and executed by one or more processors in processor unit 1804.

In these examples, program code 1818 is located in a functional form on computer readable media 1820, which is selectively removable, and may be loaded onto or transferred to data processing system 1800 for execution by processor unit 1804. Program code 1818 and computer readable media 1820 together form computer program product 1822. In this illustrative example, computer readable media 1820 may be computer readable storage media 1824 or computer readable signal media 1826.

Computer readable storage media 1824 is a physical or tangible storage device used to store program code 1818 rather than a medium that propagates or transmits program code 1818. Computer readable storage media 1824 may be, for example, without limitation, an optical or magnetic disk or a persistent storage device that is connected to data processing system 1800.

Alternatively, program code 1818 may be transferred to data processing system 1800 using computer readable signal media 1826. Computer readable signal media 1826 may be, for example, a propagated data signal containing program code 1818. This data signal may be an electromagnetic signal, an optical signal, and/or some other type of signal that can be transmitted over physical and/or wireless communications links.

The illustration of data processing system 1800 in FIG. 18 is not meant to provide architectural limitations to the manner in which the illustrative embodiments may be implemented. The different illustrative embodiments may be implemented in a data processing system that includes components in addition to or in place of those illustrated for data processing system 1800. Further, components shown in FIG. 18 may be varied from the illustrative examples shown.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method and apparatus to reduce icing conditions 214 at surface 210 of aircraft 204. Anti-icing system 208 comprises tube system 300, heating system 302, and controller 304. Tube system 300 is configured to receive air 218 from portion 220 of engine 212 and send air 218 to surface 210 of aircraft 204. Heating system 302 is physically associated with tube system 300. Heating system 302 is configured to heat air 218 flowing through tube system 300. Controller 304 is configured to control flow 306 of air 218 from portion 220 of engine 212. Controller 304 is further configured to control heating system 302 to heat surface 210 of aircraft 204 such that icing conditions 214 at surface 210 of aircraft 204 are reduced.

With the use of an illustrative embodiment, flow 306 of air 218 to inlet 406 of engine 110 is moved by controller 304 based on information 324 generated by sensor system 320. As a result, flow 306 of air 218 to inlet 406 of engine 110 is maintained at a consistent temperature. Moreover, this consistent temperature may be desired temperature 312 of air 218 to reduce icing conditions 214 at surface 210 of aircraft 204.

Illustrative embodiments are designed such that air 218 is received from a lower stage of compressor 604 before unnecessary work has been done on air 218. With heating system 302 being close to nozzle 318 where air 218 is sent to inlet 406 of engine 110, cooler air may be extracted from compressor 604, thus decreasing power usage and fuel consumption of anti-icing system 208.

In this manner, the illustrative embodiments provide dynamic control of an anti-icing system that may be used in a variety of environmental conditions without substantial risk of failure. Accordingly, icing conditions 214 may be reduced at various surfaces of aircraft 204 in a desired manner.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
a tube system connected to an engine and configured to receive air from a portion of the engine and direct the air to an anti-icing system of an aircraft; and
a heating system, located along the tube system, between the portion of the engine and a nozzle connected to the tube system, the nozzle configured to direct the air into the anti-icing system, such that the heating system comprises an electric heating element configured to heat the air as it approaches the nozzle and located along the tube system between a heat sensor and the nozzle.

2. The apparatus of claim 1, further comprising:
a controller configured to control a flow of the air from the portion of the engine and the heating system to heat a surface of the aircraft, such that icing conditions at the surface of the aircraft are reduced.

3. The apparatus of claim 1, further comprising:
a sensor system configured to generate information about the air.

4. The apparatus of claim 3, wherein the sensor system comprises a number of sensors configured to generate information about at least one of: a temperature of the air flowing through the tube system, and a pressure of the air flowing through the tube system.

5. The apparatus of claim 4, wherein the number of sensors comprises a number of temperature sensors that comprises at least one temperature sensor in a first location upstream of the heating system and at least one temperature sensor in a second location downstream of the heating system.

6. The apparatus of claim 5, further comprising:
the number of temperature sensors configured to generate information about the temperature of the air in the first location and the second location; and
a controller configured to adjust the temperature of the air via the heating system.

7. The apparatus of claim 1, wherein the tube system comprises:
a tube; and
a valve physically associated with the tube, wherein the valve is configured to be moved to control a flow of the air through the tube.

8. The apparatus of claim 1, wherein the tube system extends within a skin of the aircraft and is configured to heat the skin of the aircraft.

9. The apparatus of claim 1, wherein the heating system comprises a number of heating elements physically associated with at least one of: an inlet of the engine, a skin of the aircraft, and the tube system.

10. The apparatus of claim 1, wherein the air is at least one of heated air or pressurized air.

11. The apparatus of claim of claim 10, further comprising the pressurized air being pressurized to 40 pounds per square inch.

12. The apparatus of claim 1, wherein the tube system comprises a number of tubes connected to the engine and further comprising:
a number of valves physically associated with the number of tubes and configured to control a flow of the air through the number of tubes.

13. A method for electrically boosting a temperature of air used heating an anti-icing system of an aircraft, the method comprising:
receiving a flow of air from a portion of an engine in a tube system; and
heating via an electric heating element, the flow of air through the tube system, as the flow approaches a nozzle configured to direct the air to the anti-icing system.

14. The method of claim 13 further comprising:
controlling the flow of the air from the portion of the engine and through the electric heating element and heating a surface of the aircraft, wherein icing conditions at a surface of the aircraft are reduced.

15. The method of claim 14, wherein the tube system comprises a tube and a valve physically associated with the tube and wherein controlling the flow of the air from the portion of the engine and the electric heating element comprises:
moving the valve to control the flow of the air through the tube; and
adjusting, using the electric heating element, a temperature of the air approaching the nozzle.

16. The method of claim 15, wherein a sensor system comprises a number of temperature sensors and further comprising:
generating information about the temperature of the air using the sensor system, wherein at least one temperature sensor is located in a first location upstream of the electric heating element and at least one temperature sensor is located in a second location downstream of the electric heating element.

17. The method of claim 13, wherein the tube system comprises a number of tubes physically associated with a number of valves and receiving the flow of the air from the portion of the engine comprises:
   receiving the air from the number of tubes connected to the engine, wherein the number of valves is configured to control the flow of the air through the number of tubes.

18. The method of claim 13, wherein the air is at least one of heated air or pressurized air.

19. An anti-icing system for an aircraft, such that the anti-icing system comprises:
   a tube system connected to an engine and configured to receive air from a portion of the engine and send a flow of the air to an inlet of the engine;
   a heating system located, between a heat sensor and a nozzle, along the tube system, the nozzle configured to direct the flow of the air toward the inlet of the engine, such that the heat system comprises an electric element configured to heat the air as it passes through the heating system;
   a valve physically associated with a tube and configured to be moved to control the flow of the air through the tube system;
   a sensor system configured to generate information about at least one of: a pressure, and a temperature; and
   a controller configured to control a temperature of the air at the nozzle via a control of the flow of the air from the portion of the engine and through the heating system to an anti-icing system of the aircraft, such that icing conditions at a surface of the aircraft are reduced.

\* \* \* \* \*